US011475359B2

(12) United States Patent
Alvarez et al.

(10) Patent No.: US 11,475,359 B2
(45) Date of Patent: Oct. 18, 2022

(54) METHOD AND SYSTEM FOR EXECUTING MACHINE LEARNING ALGORITHMS ON A COMPUTER CONFIGURED ON AN AGRICULTURAL MACHINE

(71) Applicant: Climate LLC, San Francisco, CA (US)

(72) Inventors: Francisco Alvarez, San Francisco, CA (US); Mir Ali, San Francisco, CA (US); Jeff Melching, San Francisco, CA (US); Erich Hochmuth, San Francisco, CA (US)

(73) Assignee: Climate LLC, San Francisco, CA (US)

( * ) Notice: Subject to any disclaimer, the term of this patent is extended or adjusted under 35 U.S.C. 154(b) by 519 days.

(21) Appl. No.: 16/574,991

(22) Filed: Sep. 18, 2019

(65) Prior Publication Data

US 2020/0097851 A1    Mar. 26, 2020

Related U.S. Application Data

(60) Provisional application No. 62/734,420, filed on Sep. 21, 2018.

(51) Int. Cl.
*G06N 20/00* (2019.01)
*A01B 79/00* (2006.01)
(Continued)

(52) U.S. Cl.
CPC .......... *G06N 20/00* (2019.01); *A01B 79/005* (2013.01); *G05B 13/0265* (2013.01); *G06N 3/08* (2013.01)

(58) Field of Classification Search
CPC .......... G06N 20/00; G06N 3/08; G05B 13/02; G05B 13/0265; G05B 13/00;
(Continued)

(56) References Cited

U.S. PATENT DOCUMENTS

2008/0210427 A1    9/2008   Ziauddin et al.
2009/0138415 A1*   5/2009   Lancaster ................ G06N 5/04
(Continued)

FOREIGN PATENT DOCUMENTS

BR    112019019653 A2 *  4/2020  ........... G06N 3/0454
CN       209085657 U  *  7/2019  .......... G05B 19/4183
DE    102013201996 A1 *  8/2014  ........... A01B 79/005

OTHER PUBLICATIONS

International Searching Authority, "Search Report" in application No. PCT/US19/51732, dated Dec. 4, 2019, 15 pages.
(Continued)

*Primary Examiner* — Meless N Zewdu
(74) *Attorney, Agent, or Firm* — Morrison & Foerster LLP

(57) ABSTRACT

A computer-implemented data processing method providing an improvement in executing machine learning processes on digital data representing physical properties related to agriculture is described. In an embodiment, the method comprises: receiving, from a computing device, a request to browse machine learning models stored in a digital model repository; retrieving, from the digital model repository and transmitting to the computing device, information about the machine learning models stored in the digital model repository; receiving, from the computing device, a selection, from the machine learning models, of a particular model and receiving particular input for the particular model; using resources available in a model execution infrastructure platform, executing the particular model on the particular input to generate particular outputs; transmitting the particular output to a computer configured on an agricultural machine to control the agricultural machine as the agricultural machine performs agricultural tasks in an agricultural field.

20 Claims, 13 Drawing Sheets

(51) Int. Cl.
*G05B 13/02* (2006.01)
*G06N 3/08* (2006.01)

(58) Field of Classification Search
CPC .............. G05B 13/0205; G05B 13/021; G05B 2219/45017; A01B 79/00; A01B 79/005; A01B 59/06; A01B 69/00; G06F 8/71; G06F 16/242; G06F 8/36; H04W 88/02; H04W 4/18; H04W 8/245; H04W 8/22; H04W 8/24
See application file for complete search history.

(56) References Cited

U.S. PATENT DOCUMENTS

| | | |
|---|---|---|
| 2013/0212129 A1 | 8/2013 | Lawson et al. |
| 2018/0132423 A1 | 5/2018 | Rowan et al. |
| 2020/0133257 A1* | 4/2020 | Cella et al. ........ G05B 23/0294 |

OTHER PUBLICATIONS

Current Claims in application No. PCT/US19/51732, dated Dec. 2019, 6 pages.
Extended European Search Report dated Jun. 2, 2022 received in EP Application No. 19862162.5; 8 pages.

* cited by examiner

METHOD AND SYSTEM FOR EXECUTING MACHINE LEARNING ALGORITHMS ON A COMPUTER CONFIGURED ON AN AGRICULTURAL MACHINE

BENEFIT CLAIM

This application claims the benefit under 35 U.S.C. § 119(e) of provisional application 62/734,420, filed Sep. 21, 2018, the entire contents of which is hereby incorporated by reference for all purposes as if fully set forth herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright or rights whatsoever. © 2015-2019 The Climate Corporation.

FIELD OF THE DISCLOSURE

One technical field of the present disclosure is providing a computer-assisted platform for executing machine learning algorithms. Another technical field is classifying, cataloging, executing and monitoring the machine learning models, and providing model scaling capabilities for executing the models. Another technical field is computer-implemented techniques for browsing, selecting and executing machine learning models, and controlling agricultural equipment using outputs generated by the models.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In the context of agriculture, crop growers often seek recommendations for seed selections and seed planting for agricultural fields. The recommendations may be customized to, for example, the fields' locations, climate, and soil types, as well as to the growers' objectives.

Typically, seed and planting recommendations are generated by complex computer-based systems that execute digital models on copious amounts of agricultural data and that require enormous computational resources. The systems, however, rarely provide customization functions. For example, some systems may not be able to configure and scale the models to generate sufficiently specific recommendations.

Furthermore, even if customizations of agricultural models are enabled, customizing the models may result in obtaining such a huge number of customized models that managing and maintaining the models may be problematic. For example, it may be difficult to track and catalog the various versions of the models and make them readily accessible to farmer.

SUMMARY

The appended claims may serve as a summary of the disclosure.

BRIEF DESCRIPTION OF THE DRAWINGS

In the drawings:

FIG. 6 depicts an example embodiment of a spreadsheet view for data entry.

DETAILED DESCRIPTION

Figure 1:
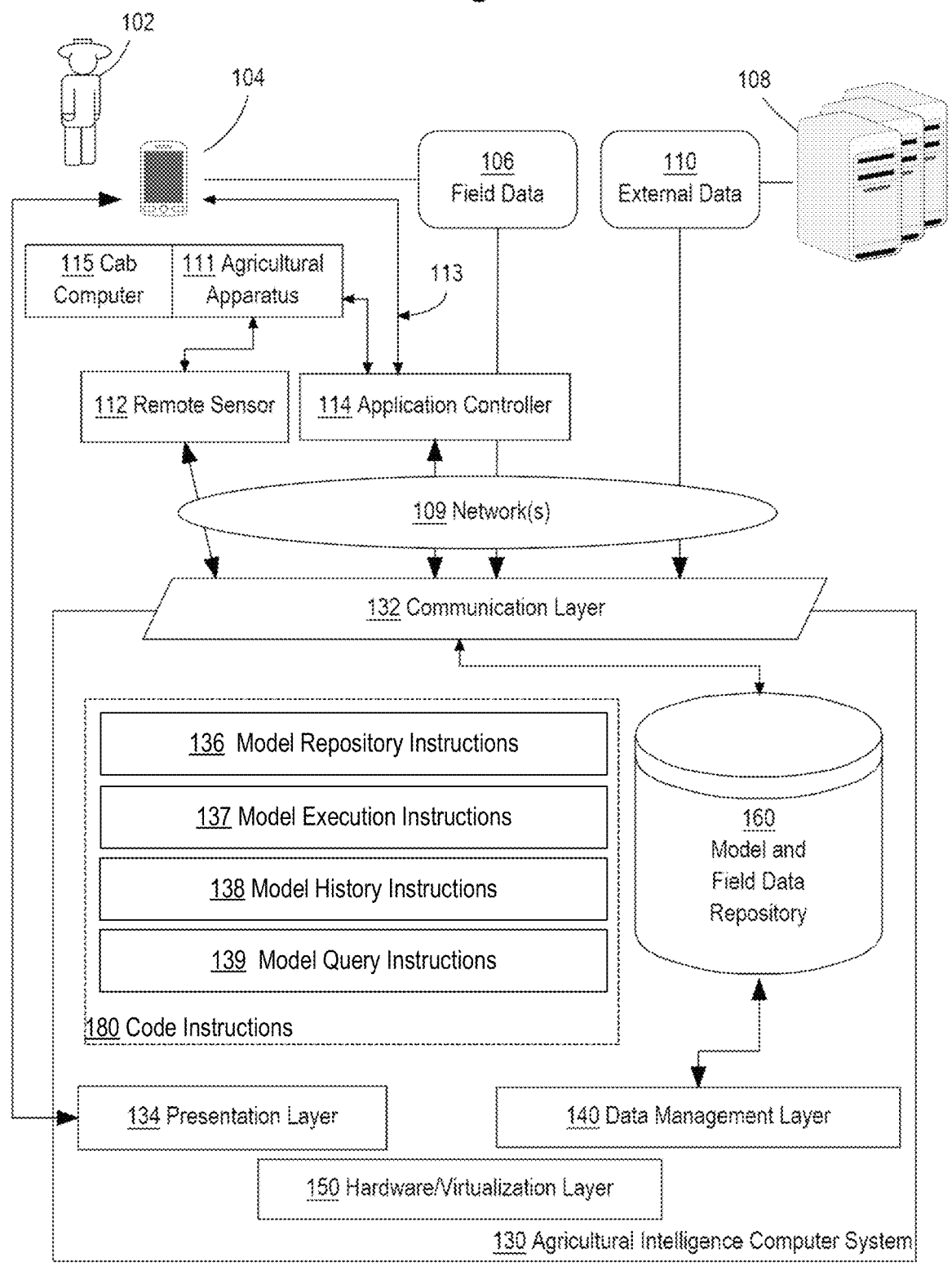
FIG. 1 illustrates an example computer system that is configured to perform the functions described herein, shown in a field environment with other apparatus with which the system may interoperate.

In the following description, for the purposes of explanation, numerous specific details are set forth in order to provide a thorough understanding of the present disclosure. It will be apparent, however, that embodiments may be practiced without these specific details. In other instances, well-known structures and devices are shown in block diagram form in order to avoid unnecessarily obscuring the present disclosure. Embodiments are disclosed in sections according to the following outline:

1. GENERAL OVERVIEW
2. EXAMPLE AGRICULTURAL INTELLIGENCE COMPUTER SYSTEM
   2.1. STRUCTURAL OVERVIEW
   2.2. APPLICATION PROGRAM OVERVIEW
   2.3. DATA INGEST TO THE COMPUTER SYSTEM
   2.4. PROCESS OVERVIEW—AGRONOMIC MODEL TRAINING
   2.5. IMPLEMENTATION EXAMPLE—HARDWARE OVERVIEW
3. SYSTEM FOR EXECUTING MACHINE LEARNING ALGORITHMS
   3.1. EXAMPLE MODEL REPOSITORY
   3.2. EXAMPLE MODEL EXECUTION INFRASTRUCTURE
   3.3. EXAMPLE MODEL HISTORY LOG
4. SCALABILITY CONSIDERATIONS
5. EXAMPLE IMPLEMENTATIONS
6. BENEFITS OF CERTAIN EMBODIMENTS
7. EXTENSIONS AND ALTERNATIVES

1. General Overview

In an embodiment, computer-implemented methods, computer systems and computer program products are described for executing machine learning algorithms. They may include a computer-based platform for storing, cataloging, and executing machine-learning models. The platform is programmed to catalog generic definitions and metadata of the models, store the models in a repository, browse and selecting the models from the repository, and abstract execution components to facilitate execution of models in a repeatable fashion. Examples of machine-based models include operation research models, machine learning models, deep learning models and physical models.

In an embodiment, an approach for executing machine learning algorithms provides functionalities for customizing agricultural models, cataloging, maintaining and managing a vast number of customized models, and facilitating execution of the models to provide specific recommendations to crop growers. The approach for storing, executing, and cataloging machine-based models allows deploying different versions of the models, adding new models and new model versions to a model repository, and providing hardware/software runtime infrastructure for executing the models.

In an embodiment, a platform for storing, executing, and cataloging machine-based models includes a model repository, a model execution infrastructure platform, and a model history log.

The model repository is a computer-based, digital data repository configured to store digital data models. The models may have different configurations and different execution requirements. For each model, the repository may store, for example, model definitions and model metadata that capture the components and characteristics of the model. The model definitions and metadata associated with a model may include information about the model's name, input, output, infrastructure requirements, version, status, and the like. The model repository is searchable, modifiable and browsable.

The model execution infrastructure platform includes hardware and/or software components that collectively provide platforms for executing the machine-based models. Components of the model execution infrastructure are referred to herein as generic infrastructure components. The components are building blocks for executing the models stored in a model repository.

The model history log is a computer-based, digital log that contains information about execution of machine-based models. A log for a model may include information about each execution instance performed for the model. This may include the information about versions, inputs, outputs, execution requirements, modifications and updates, execution dates, statistical information, and other information that pertains to the model's execution.

In an embodiment, an approach for executing machine learning algorithms is implemented for agricultural applications. The algorithms may be configured to, for example, solve agriculture-related problems, and to provide answers to queries requesting agricultural recommendations. For example, the approach may allow a crop grower to browse the models stored in a model repository, select a model from the repository, provide input for the selected model, initiate execution of the selected model on a model infrastructure platform to generate recommendations for the grower, and receive the recommendations from the platform.

The machine learning algorithms may include implementations of neural networks configured to, for example, receive inputs from crop growers, process the received inputs, and generate recommendations for the growers. The recommendations may include, for example, recommendations for the type of seeds and the timing for the seed planting that, based on the grower-provided inputs would be beneficial to the grower. The inputs may include information about the soil, climate, and location of the grower's field. The recommendations may be transmitted from the neural network to one or more computing devices that are available to the crop grower. For example, the recommendations may be transmitted from the neural network to a mobile device that the crop grower uses to communicate with the network.

According to another example, the machine learning algorithms may include implementations of neural networks that are configured to receive, from a crop grower, seed planting requests. A neural network may process the requests and generate planting instructions for planting the seeds using agricultural equipment such as seeders and planters. The planting instructions may be transmitted to the grower's mobile devices. The planting instructions may be also transmitted to computers or controllers that are installed on the agricultural machines. The controllers may use the instructions to control the behaviors of the machines as the machines perform the seed planting in the field.

In an embodiment, an approach for executing machine learning algorithms implements a graphical user interface. The graphical user interface may be configured to access a model repository, a model execution infrastructure platform, and a model history log. The graphical user interface may be used to, for example, issue queries to the repository, facilitate browsing content of the repository, display information about the models stored in the repository, receive a selection of a model from the models stored in the repository, facilitate providing input to the selected model, facilitate execution of the selected model, and display output generated by the executed model.

2. Example Agricultural Intelligence Computer System

2.1. Structural Overview

FIG. 1 illustrates an example computer system that is configured to perform the functions described herein, shown in a field environment with other apparatus with which the system may interoperate. In one embodiment, a user 102 owns, operates or possesses a field manager computing device 104 in a field location or associated with a field location such as a field intended for agricultural activities or a management location for one or more agricultural fields. The field manager computer device 104 is programmed or configured to provide field data 106 to an agricultural intelligence computer system 130 via one or more networks 109.

Examples of field data 106 include (a) identification data (for example, acreage, field name, field identifiers, geographic identifiers, boundary identifiers, crop identifiers, and any other suitable data that may be used to identify farm land, such as a common land unit (CLU), lot and block number, a parcel number, geographic coordinates and boundaries, Farm Serial Number (FSN), farm number, tract number, field number, section, township, and/or range), (b) harvest data (for example, crop type, crop variety, crop rotation, whether the crop is grown organically, harvest date, Actual Production History (APH), expected yield, yield, crop price, crop revenue, grain moisture, tillage practice, and previous growing season information), (c) soil data (for example, type, composition, pH, organic matter (OM), cation exchange capacity (CEC)), (d) planting data (for example, planting date, seed(s) type, relative maturity (RM) of planted seed(s), seed population), (e) fertilizer data (for example, nutrient type (Nitrogen, Phosphorus, Potassium), application type, application date, amount, source, method), (f) chemical application data (for example, pesticide, herbicide, fungicide, other substance or mixture of substances intended for use as a plant regulator, defoliant, or desiccant, application date, amount, source, method), (g) irrigation data (for example, application date, amount, source, method), (h) weather data (for example, precipitation, rainfall rate, predicted rainfall, water runoff rate region, temperature, wind, forecast, pressure, visibility, clouds, heat index, dew point, humidity, snow depth, air quality, sunrise, sunset), (i) imagery data (for example, imagery and light spectrum information from an agricultural apparatus sensor, camera, computer, smartphone, tablet, unmanned aerial vehicle, planes or satellite), (j) scouting observations (photos, videos, free form notes, voice recordings, voice transcriptions, weather conditions (temperature, precipitation (current and over time), soil moisture, crop growth stage, wind velocity, relative humidity, dew point, black layer)), and (k) soil, seed, crop phenology, pest and disease reporting, and predictions sources and databases.

A data server computer 108 is communicatively coupled to agricultural intelligence computer system 130 and is programmed or configured to send external data 110 to agricultural intelligence computer system 130 via the network(s) 109. The external data server computer 108 may be owned or operated by the same legal person or entity as the agricultural intelligence computer system 130, or by a different person or entity such as a government agency, non-governmental organization (NGO), and/or a private data service provider. Examples of external data include weather data, imagery data, soil data, or statistical data relating to crop yields, among others. External data 110 may consist of the same type of information as field data 106. In some embodiments, the external data 110 is provided by an external data server 108 owned by the same entity that owns and/or operates the agricultural intelligence computer system 130. For example, the agricultural intelligence computer system 130 may include a data server focused exclusively on a type of data that might otherwise be obtained from third party sources, such as weather data. In some embodiments, an external data server 108 may actually be incorporated within the system 130.

An agricultural apparatus 111 may have one or more remote sensors 112 fixed thereon, which sensors are communicatively coupled either directly or indirectly via agricultural apparatus 111 to the agricultural intelligence computer system 130 and are programmed or configured to send sensor data to agricultural intelligence computer system 130. Examples of agricultural apparatus 111 include tractors, combines, harvesters, planters, trucks, fertilizer equipment, aerial vehicles including unmanned aerial vehicles, and any other item of physical machinery or hardware, typically mobile machinery, and which may be used in tasks associated with agriculture. In some embodiments, a single unit of apparatus 111 may comprise a plurality of sensors 112 that are coupled locally in a network on the apparatus; controller area network (CAN) is example of such a network that can be installed in combines, harvesters, sprayers, and cultivators. Application controller 114 is communicatively coupled to agricultural intelligence computer system 130 via the network(s) 109 and is programmed or configured to receive one or more scripts that are used to control an operating parameter of an agricultural vehicle or implement from the agricultural intelligence computer system 130. For instance, a controller area network (CAN) bus interface may be used to enable communications from the agricultural intelligence computer system 130 to the agricultural apparatus 111, such as how the CLIMATE FIELDVIEW DRIVE, available from The Climate Corporation, San Francisco, Calif., is used. Sensor data may consist of the same type of information as field data 106. In some embodiments, remote sensors 112 may not be fixed to an agricultural apparatus 111 but may be remotely located in the field and may communicate with network 109.

The apparatus 111 may comprise a cab computer 115 that is programmed with a cab application, which may comprise a version or variant of the mobile application for device 104 that is further described in other sections herein. In an embodiment, cab computer 115 comprises a compact computer, often a tablet-sized computer or smartphone, with a graphical screen display, such as a color display, that is mounted within an operator's cab of the apparatus 111. Cab computer 115 may implement some or all of the operations and functions that are described further herein for the mobile computer device 104.

The network(s) 109 broadly represent any combination of one or more data communication networks including local area networks, wide area networks, internetworks or internets, using any of wireline or wireless links, including terrestrial or satellite links. The network(s) may be implemented by any medium or mechanism that provides for the exchange of data between the various elements of FIG. 1. The various elements of FIG. 1 may also have direct (wired or wireless) communications links. The sensors 112, controller 114, external data server computer 108, and other elements of the system each comprise an interface compatible with the network(s) 109 and are programmed or configured to use standardized protocols for communication across the networks such as TCP/IP, Bluetooth, CAN protocol and higher-layer protocols such as HTTP, TLS, and the like.

Agricultural intelligence computer system 130 is programmed or configured to receive field data 106 from field manager computing device 104, external data 110 from external data server computer 108, and sensor data from remote sensor 112. Agricultural intelligence computer system 130 may be further configured to host, use or execute one or more computer programs, other software elements, digitally programmed logic such as FPGAs or ASICs, or any combination thereof to perform translation and storage of data values, construction of digital models of one or more crops on one or more fields, generation of recommendations and notifications, and generation and sending of scripts to application controller 114, in the manner described further in other sections of this disclosure.

In an embodiment, agricultural intelligence computer system 130 is programmed with or comprises a communication layer 132, presentation layer 134, data management layer 140, hardware/virtualization layer 150, model and field data repository 160, and code instructions 180. "Layer," in this context, refers to any combination of electronic digital interface circuits, microcontrollers, firmware such as drivers, and/or computer programs or other software elements.

Communication layer 132 may be programmed or configured to perform input/output interfacing functions including sending requests to field manager computing device 104, external data server computer 108, and remote sensor 112 for field data, external data, and sensor data respectively. Communication layer 132 may be programmed or configured to send the received data to model and field data repository 160 to be stored as field data 106.

In an embodiment, code instructions 180 comprise model repository instructions 136, model execution instructions 137, model history instructions 138, and model query instructions 139. Additional code instructions may be also included. Model repository instructions 136 may be used to generate and maintain a model repository for creating, storing, cataloging and browsing machine-based models. Model execution instructions 137 may be used to determine execution requirements for machine-based models, manage execution resources available in a model execution infrastructure platform, and manage execution of the models in the model execution infrastructure platform. Model history instructions 138 may be used to generate history logs for the models that are executed in the model execution infrastructure platform, aggregate the logs, and provide log browsing functionalities. Model query instructions 139 may be used to receive, process, and resolve queries issued to the model-learning algorithm platform.

Presentation layer 134 may be programmed or configured to generate a graphical user interface (GUI) to be displayed on field manager computing device 104, cab computer 115 or other computers that are coupled to the system 130 through the network 109. The GUI may comprise controls for inputting data to be sent to agricultural intelligence computer system 130, generating requests for models and/or recommendations, and/or displaying recommendations, notifications, models, and other field data.

Data management layer 140 may be programmed or configured to manage read operations and write operations involving the repository 160 and other functional elements of the system, including queries and result sets communicated between the functional elements of the system and the repository. Examples of data management layer 140 include JDBC, SQL server interface code, and/or HADOOP interface code, among others. Repository 160 may comprise a database. As used herein, the term "database" may refer to either a body of data, a relational database management system (RDBMS), or to both. As used herein, a database may comprise any collection of data including hierarchical databases, relational databases, flat file databases, object-relational databases, object-oriented databases, distributed databases, and any other structured collection of records or data that is stored in a computer system. Examples of RDBMS's include, but are not limited to including, ORACLE®, MYSQL, IBM® DB2, MICROSOFT® SQL SERVER, SYBASE®, and POSTGRESQL databases. However, any database may be used that enables the systems and methods described herein.

When field data 106 is not provided directly to the agricultural intelligence computer system via one or more agricultural machines or agricultural machine devices that interacts with the agricultural intelligence computer system, the user may be prompted via one or more user interfaces on the user device (served by the agricultural intelligence computer system) to input such information. In an example embodiment, the user may specify identification data by accessing a map on the user device (served by the agricultural intelligence computer system) and selecting specific CLUs that have been graphically shown on the map. In an alternative embodiment, the user 102 may specify identification data by accessing a map on the user device (served by the agricultural intelligence computer system 130) and drawing boundaries of the field over the map. Such CLU selection or map drawings represent geographic identifiers. In alternative embodiments, the user may specify identification data by accessing field identification data (provided as shape files or in a similar format) from the U. S. Department of Agriculture Farm Service Agency or other source via the user device and providing such field identification data to the agricultural intelligence computer system.

In an example embodiment, the agricultural intelligence computer system 130 is programmed to generate and cause displaying a graphical user interface comprising a data manager for data input. After one or more fields have been identified using the methods described above, the data manager may provide one or more graphical user interface widgets which when selected can identify changes to the field, soil, crops, tillage, or nutrient practices. The data manager may include a timeline view, a spreadsheet view, and/or one or more editable programs.

Figure 5:
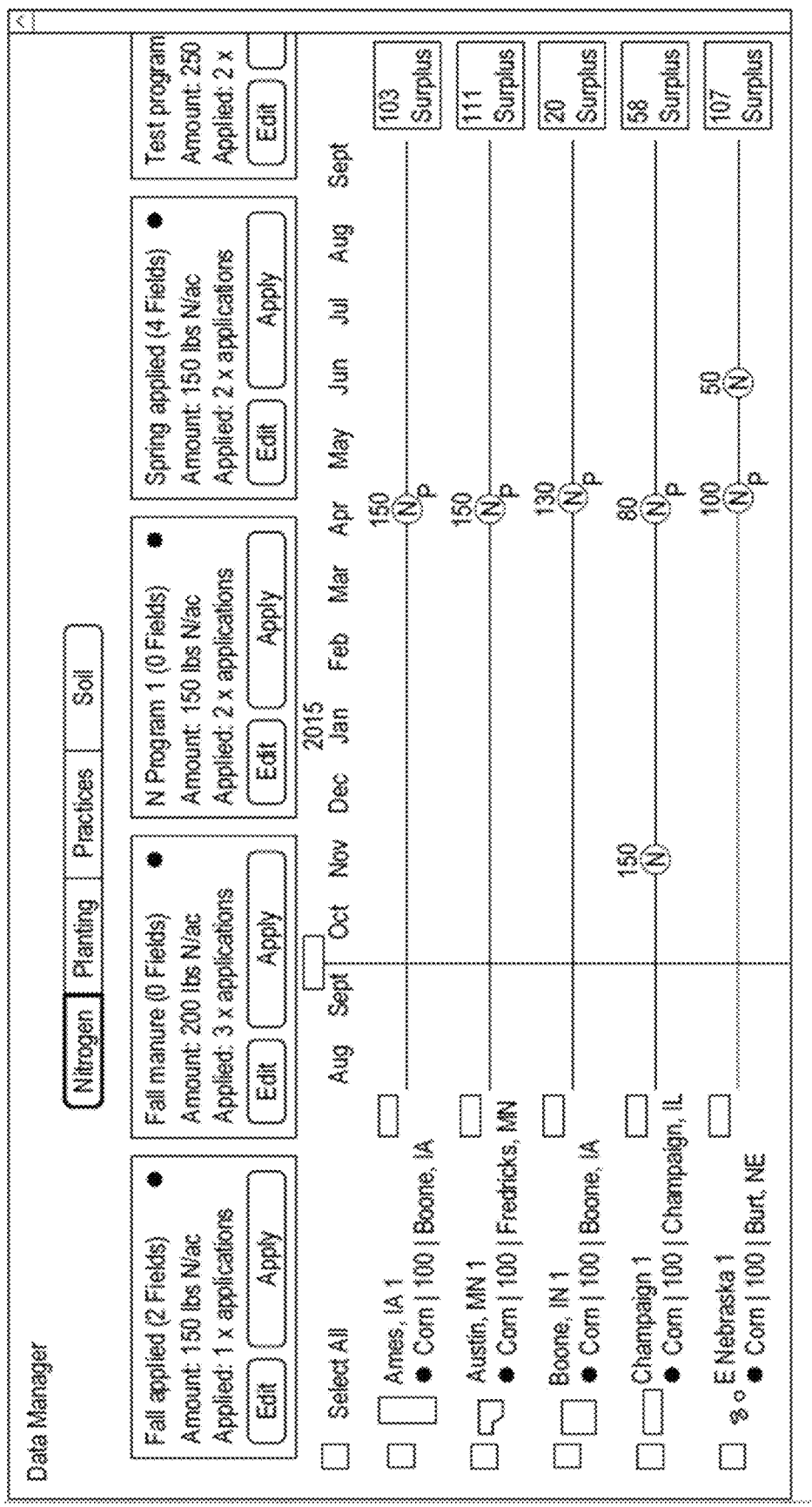
FIG. 5 depicts an example embodiment of a timeline view for data entry.

FIG. 5 depicts an example embodiment of a timeline view for data entry. Using the display depicted in FIG. 5, a user computer can input a selection of a particular field and a particular date for the addition of event. Events depicted at the top of the timeline may include Nitrogen, Planting, Practices, and Soil. To add a nitrogen application event, a user computer may provide input to select the nitrogen tab. The user computer may then select a location on the timeline for a particular field in order to indicate an application of nitrogen on the selected field. In response to receiving a selection of a location on the timeline for a particular field, the data manager may display a data entry overlay, allowing the user computer to input data pertaining to nitrogen applications, planting procedures, soil management, tillage procedures, irrigation practices, or other information relating to the particular field. For example, if a user computer selects a portion of the timeline and indicates an application of nitrogen, then the data entry overlay may include fields for inputting an amount of nitrogen applied, a date of application, a type of fertilizer used, and any other information related to the application of nitrogen.

In an embodiment, the data manager provides an interface for creating one or more programs. "Program," in this context, refers to a set of data pertaining to nitrogen applications, planting procedures, soil application, tillage procedures, irrigation practices, or other information that may be related to one or more fields, and that can be stored in digital data storage for reuse as a set in other operations. After a program has been created, it may be conceptually applied to one or more fields and references to the program may be stored in digital storage in association with data identifying the fields. Thus, instead of manually entering identical data relating to the same nitrogen applications for multiple different fields, a user computer may create a program that indicates a particular application of nitrogen and then apply the program to multiple different fields. For example, in the timeline view of FIG. 5, the top two timelines have the "Spring applied" program selected, which includes an application of 150 lbs N/ac in early April. The data manager may provide an interface for editing a program. In an embodiment, when a particular program is edited, each field that has selected the particular program is edited. For example, in FIG. 5, if the "Spring applied" program is edited to reduce the application of nitrogen to 130 lbs. N/ac, the top two fields may be updated with a reduced application of nitrogen based on the edited program.

In an embodiment, in response to receiving edits to a field that has a program selected, the data manager removes the correspondence of the field to the selected program. For example, if a nitrogen application is added to the top field in FIG. 5, the interface may update to indicate that the "Spring applied" program is no longer being applied to the top field. While the nitrogen application in early April may remain, updates to the "Spring applied" program would not alter the April application of nitrogen.

Figure 6:
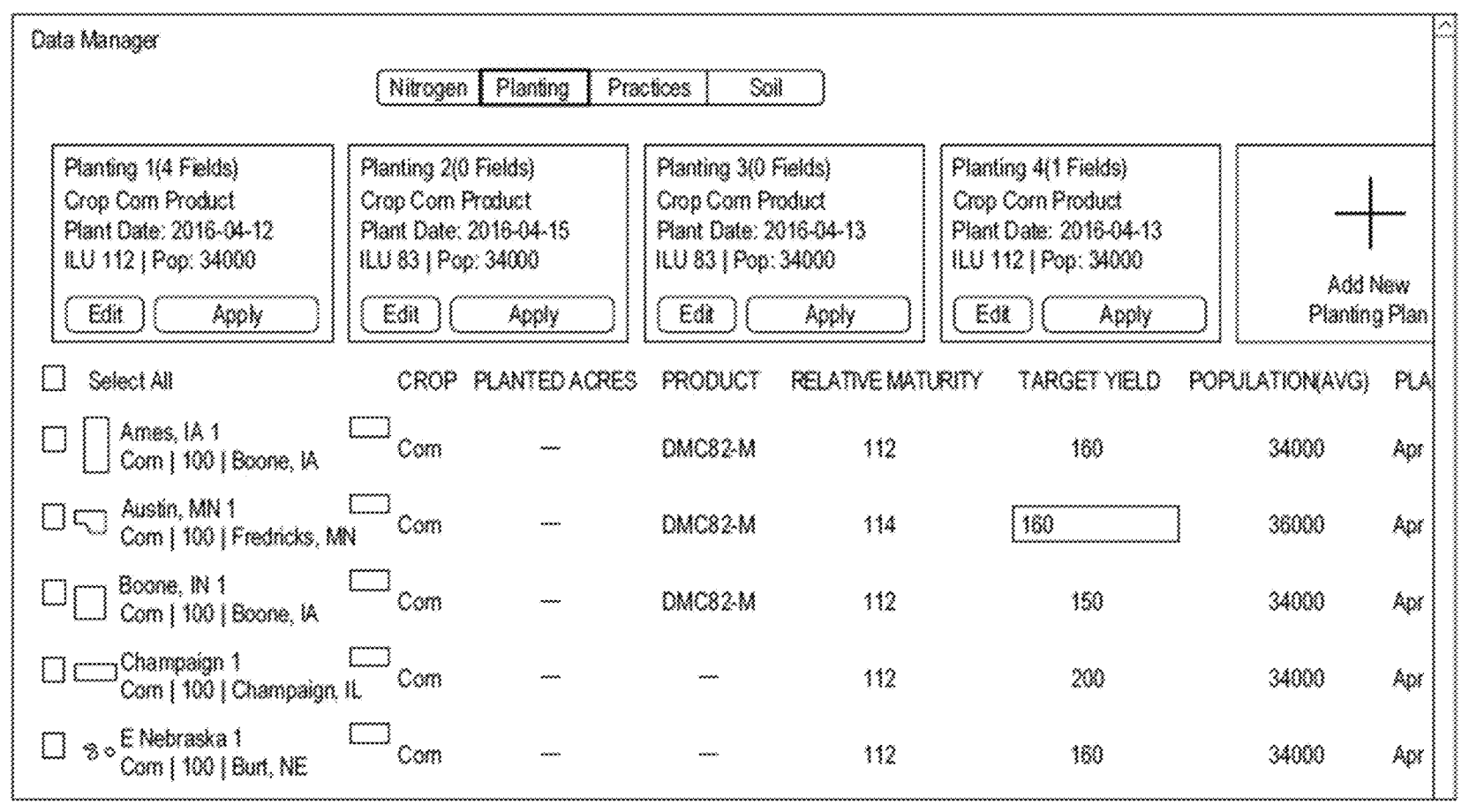

FIG. 6 depicts an example embodiment of a spreadsheet view for data entry. Using the display depicted in FIG. 6, a user can create and edit information for one or more fields. The data manager may include spreadsheets for inputting information with respect to Nitrogen, Planting, Practices, and Soil as depicted in FIG. 6. To edit a particular entry, a user computer may select the particular entry in the spreadsheet and update the values. For example, FIG. 6 depicts an in-progress update to a target yield value for the second field. Additionally, a user computer may select one or more fields in order to apply one or more programs. In response to receiving a selection of a program for a particular field, the data manager may automatically complete the entries for the particular field based on the selected program. As with the timeline view, the data manager may update the entries for each field associated with a particular program in response to receiving an update to the program. Additionally, the data manager may remove the correspondence of the selected program to the field in response to receiving an edit to one of the entries for the field.

In an embodiment, model and field data is stored in model and field data repository 160. Model data comprises data models created for one or more fields. For example, a crop model may include a digitally constructed model of the development of a crop on the one or more fields. "Model," in this context, refers to an electronic digitally stored set of executable instructions and data values, associated with one another, which are capable of receiving and responding to a programmatic or other digital call, invocation, or request for resolution based upon specified input values, to yield one or more stored or calculated output values that can serve as the basis of computer-implemented recommendations, output data displays, or machine control, among other things. Persons of skill in the field find it convenient to express models using mathematical equations, but that form of expression does not confine the models disclosed herein to abstract concepts; instead, each model herein has a practical application in a computer in the form of stored executable instructions and data that implement the model using the computer. The model may include a model of past events on the one or more fields, a model of the current status of the one or more fields, and/or a model of predicted events on the one or more fields. Model and field data may be stored in data structures in memory, rows in a database table, in flat files or spreadsheets, or other forms of stored digital data.

Figure 4:
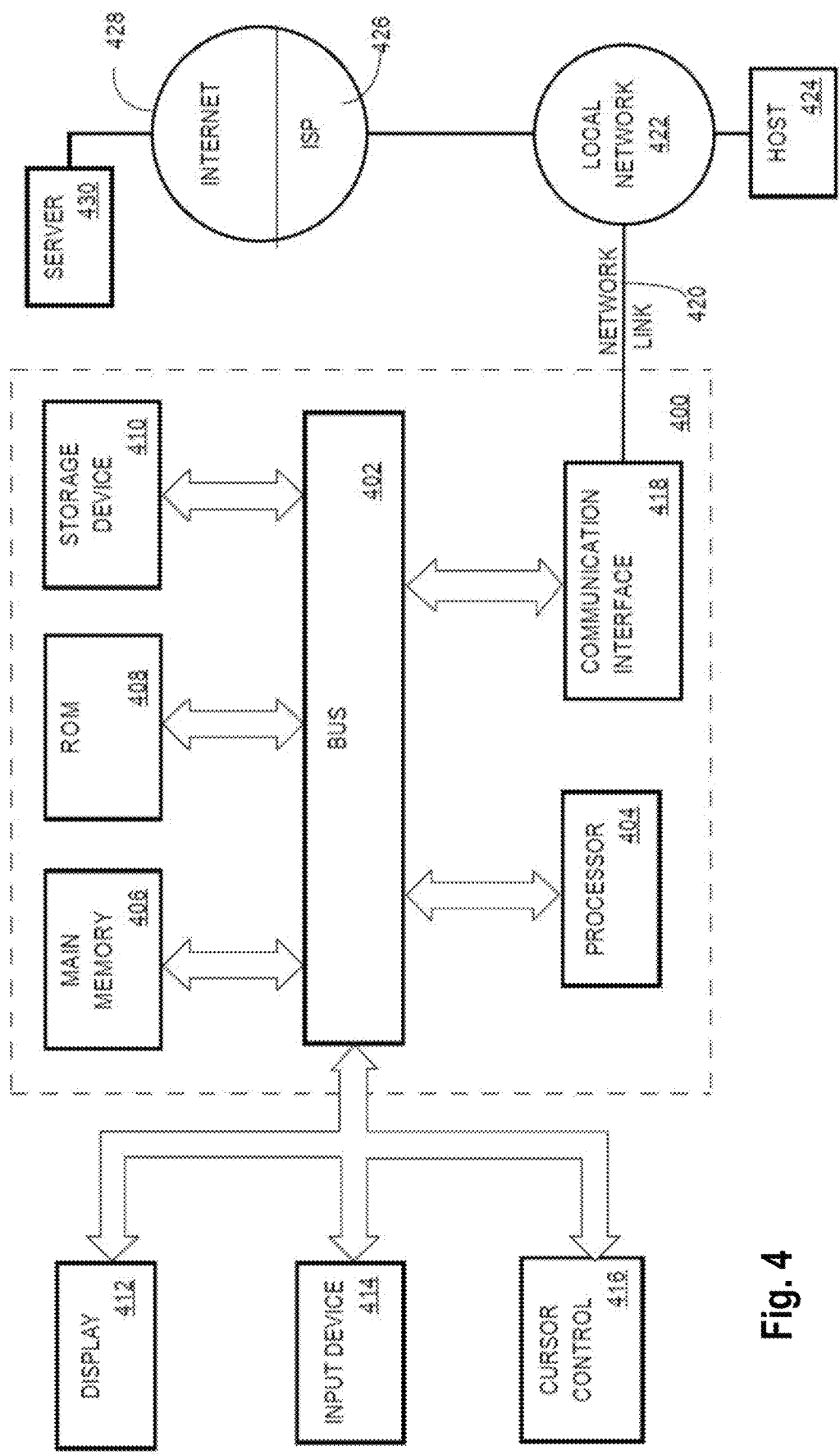
FIG. 4 is a block diagram that illustrates a computer system upon which an embodiment of the invention may be implemented.

Hardware/virtualization layer 150 comprises one or more central processing units (CPUs), memory controllers, and other devices, components, or elements of a computer system such as volatile or non-volatile memory, non-volatile storage such as disk, and I/O devices or interfaces as illustrated and described, for example, in connection with FIG. 4. The layer 150 also may comprise programmed instructions that are configured to support virtualization, containerization, or other technologies.

For purposes of illustrating a clear example, FIG. 1 shows a limited number of instances of certain functional elements. However, in other embodiments, there may be any number of such elements. For example, embodiments may use thousands or millions of different mobile computing devices 104 associated with different users. Further, the system 130 and/or external data server computer 108 may be implemented using two or more processors, cores, clusters, or instances of physical machines or virtual machines, configured in a discrete location or co-located with other elements in a datacenter, shared computing facility or cloud computing facility.

2.2. Application Program Overview

In an embodiment, the implementation of the functions described herein using one or more computer programs or other software elements that are loaded into and executed using one or more general-purpose computers will cause the general-purpose computers to be configured as a particular machine or as a computer that is specially adapted to perform the functions described herein. Further, each of the flow diagrams that are described further herein may serve, alone or in combination with the descriptions of processes and functions in prose herein, as algorithms, plans or directions that may be used to program a computer or logic to implement the functions that are described. In other words, all the prose text herein, and all the drawing figures, together are intended to provide disclosure of algorithms, plans or directions that are sufficient to permit a skilled person to program a computer to perform the functions that are described herein, in combination with the skill and knowledge of such a person given the level of skill that is appropriate for inventions and disclosures of this type.

In an embodiment, user 102 interacts with agricultural intelligence computer system 130 using field manager computing device 104 configured with an operating system and one or more application programs or apps; the field manager computing device 104 also may interoperate with the agricultural intelligence computer system independently and automatically under program control or logical control and direct user interaction is not always required. Field manager computing device 104 broadly represents one or more smartphones, PDA, tablet computing device, laptop computer, desktop computer, workstation, or any other computing device capable of transmitting and receiving information and performing the functions described herein. Field manager computing device 104 may communicate via a network using a mobile application stored on field manager computing device 104, and in some embodiments, the device may be coupled using a cable 113 or connector to the sensor 112 and/or controller 114. A particular user 102 may own, operate or possess and use, in connection with system 130, more than one field manager computing device 104 at a time.

The mobile application may provide client-side functionality, via the network to one or more mobile computing devices. In an example embodiment, field manager computing device 104 may access the mobile application via a web browser or a local client application or app. Field manager computing device 104 may transmit data to, and receive data from, one or more front-end servers, using web-based protocols or formats such as HTTP, XML and/or JSON, or app-specific protocols. In an example embodiment, the data may take the form of requests and user information input, such as field data, into the mobile computing device. In some embodiments, the mobile application interacts with location tracking hardware and software on field manager computing device 104 which determines the location of field manager computing device 104 using standard tracking techniques such as multi-lateration of radio signals, the global positioning system (GPS), Wi-Fi positioning systems, or other methods of mobile positioning. In some cases, location data or other data associated with the device 104, user 102, and/or user account(s) may be obtained by queries to an operating system of the device or by requesting an app on the device to obtain data from the operating system.

In an embodiment, field manager computing device 104 sends field data 106 to agricultural intelligence computer system 130 comprising or including, but not limited to, data values representing one or more of: a geographical location of the one or more fields, tillage information for the one or more fields, crops planted in the one or more fields, and soil data extracted from the one or more fields. Field manager computing device 104 may send field data 106 in response to user input from user 102 specifying the data values for the one or more fields. Additionally, field manager computing device 104 may automatically send field data 106 when one or more of the data values becomes available to field manager computing device 104. For example, field manager computing device 104 may be communicatively coupled to remote sensor 112 and/or application controller 114 which include an irrigation sensor and/or irrigation controller. In response to receiving data indicating that application controller 114 released water onto the one or more fields, field manager computing device 104 may send field data 106 to agricultural intelligence computer system 130 indicating that water was released on the one or more fields. Field data 106 identified in this disclosure may be input and communicated using electronic digital data that is communicated between computing devices using parameterized URLs over HTTP, or another suitable communication or messaging protocol.

A commercial example of the mobile application is CLIMATE FIELDVIEW, commercially available from The Climate Corporation, San Francisco, Calif. The CLIMATE FIELDVIEW application, or other applications, may be modified, extended, or adapted to include features, functions, and programming that have not been disclosed earlier than the filing date of this disclosure. In one embodiment, the mobile application comprises an integrated software platform that allows a grower to make fact-based decisions for their operation because it combines historical data about the grower's fields with any other data that the grower wishes to compare. The combinations and comparisons may be performed in real time and are based upon scientific models that provide potential scenarios to permit the grower to make better, more informed decisions.

Figure 2:
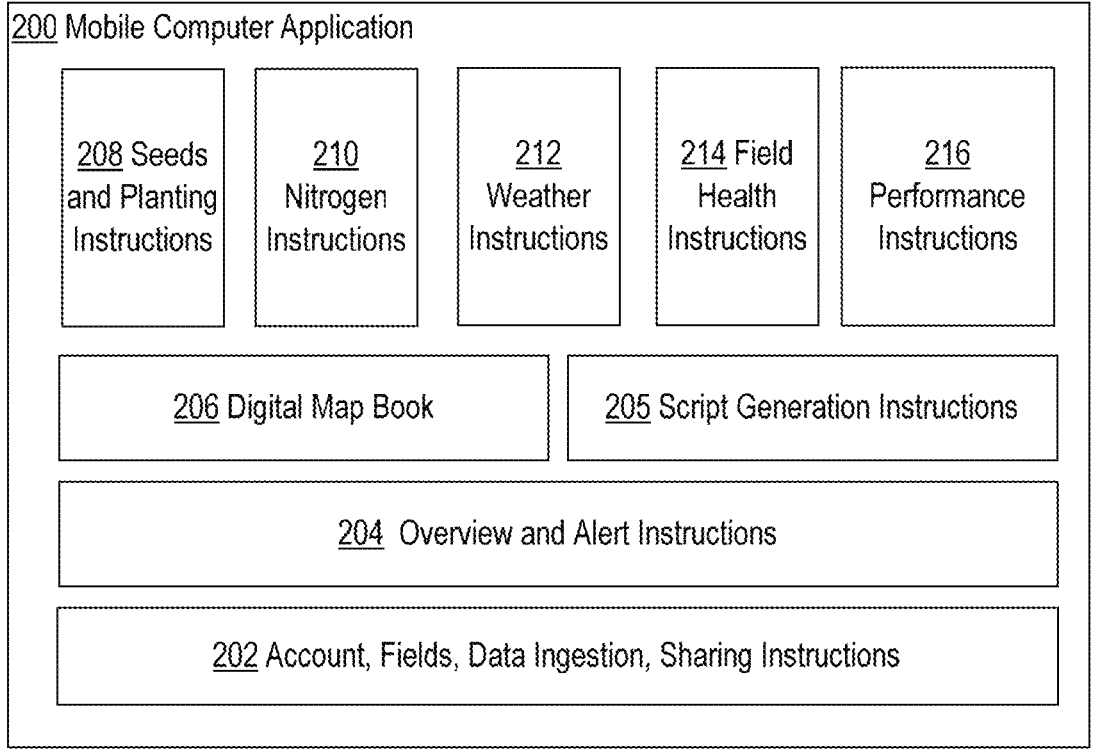
FIG. 2 illustrates two views of an example logical organization of sets of instructions in main memory when an example mobile application is loaded for execution.
Figure 2:
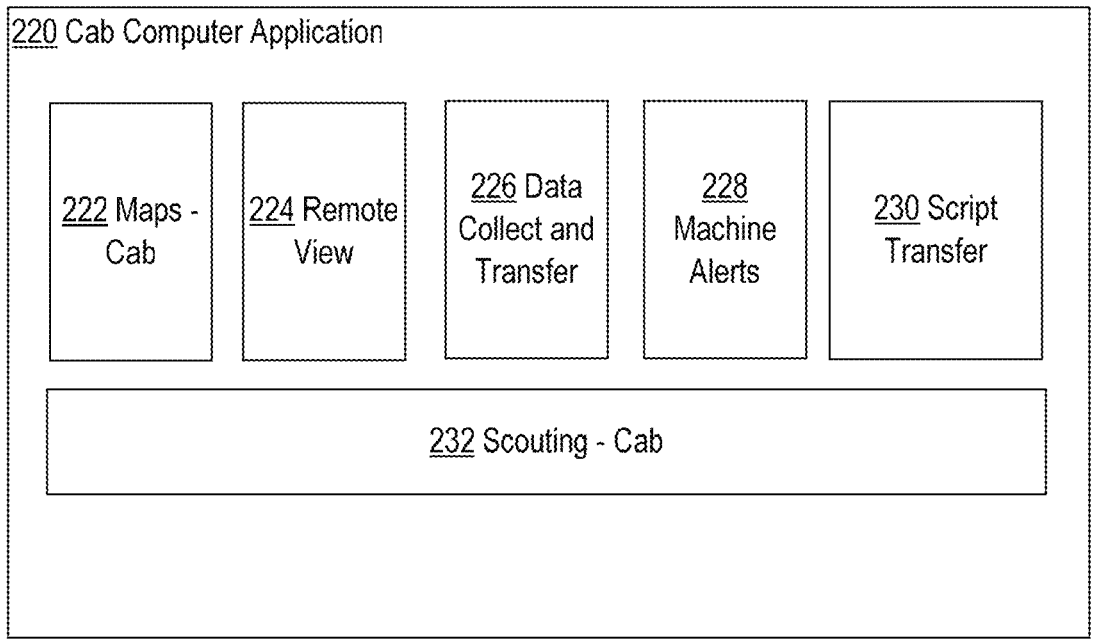

FIG. 2 illustrates two views of an example logical organization of sets of instructions in main memory when an example mobile application is loaded for execution. In FIG. 2, each named element represents a region of one or more pages of RAM or other main memory, or one or more blocks of disk storage or other non-volatile storage, and the programmed instructions within those regions. In one embodiment, in view (a), a mobile computer application 200 comprises account-fields-data ingestion-sharing instructions 202, overview and alert instructions 204, digital map book instructions 206, seeds and planting instructions 208, nitrogen instructions 210, weather instructions 212, field health instructions 214, and performance instructions 216.

In one embodiment, a mobile computer application 200 comprises account, fields, data ingestion, sharing instructions 202 which are programmed to receive, translate, and ingest field data from third party systems via manual upload or APIs. Data types may include field boundaries, yield maps, as-planted maps, soil test results, as-applied maps, and/or management zones, among others. Data formats may include shapefiles, native data formats of third parties, and/or farm management information system (FMIS) exports, among others. Receiving data may occur via manual upload, email with attachment, external APIs that push data to the mobile application, or instructions that call APIs of external systems to pull data into the mobile application. In one embodiment, mobile computer application 200 comprises a data inbox. In response to receiving a selection of the data inbox, the mobile computer application 200 may display a graphical user interface for manually uploading data files and importing uploaded files to a data manager.

In one embodiment, digital map book instructions 206 comprise field map data layers stored in device memory and are programmed with data visualization tools and geospatial field notes. This provides growers with convenient information close at hand for reference, logging and visual insights into field performance. In one embodiment, overview and alert instructions 204 are programmed to provide an operation-wide view of what is important to the grower, and timely recommendations to act or focus on particular issues. This permits the grower to focus time on what needs attention, to save time and preserve yield throughout the season. In one embodiment, seeds and planting instructions 208 are programmed to provide tools for seed selection, hybrid placement, and script creation, including variable rate (VR) script creation, based upon scientific models and empirical data. This enables growers to maximize yield or return on investment through optimized seed purchase, placement and population.

In one embodiment, script generation instructions 205 are programmed to provide an interface for generating scripts, including variable rate (VR) fertility scripts. The interface enables growers to create scripts for field implements, such as nutrient applications, planting, and irrigation. For example, a planting script interface may comprise tools for identifying a type of seed for planting. Upon receiving a selection of the seed type, mobile computer application 200 may display one or more fields broken into management zones, such as the field map data layers created as part of digital map book instructions 206. In one embodiment, the management zones comprise soil zones along with a panel identifying each soil zone and a soil name, texture, drainage for each zone, or other field data. Mobile computer application 200 may also display tools for editing or creating such, such as graphical tools for drawing management zones, such as soil zones, over a map of one or more fields. Planting procedures may be applied to all management zones or different planting procedures may be applied to different subsets of management zones. When a script is created, mobile computer application 200 may make the script available for download in a format readable by an application controller, such as an archived or compressed format. Additionally, and/or alternatively, a script may be sent directly to cab computer 115 from mobile computer application 200 and/or uploaded to one or more data servers and stored for further use.

In one embodiment, nitrogen instructions 210 are programmed to provide tools to inform nitrogen decisions by visualizing the availability of nitrogen to crops. This enables growers to maximize yield or return on investment through optimized nitrogen application during the season. Example programmed functions include displaying images such as SSURGO images to enable drawing of fertilizer application zones and/or images generated from subfield soil data, such as data obtained from sensors, at a high spatial resolution (as fine as millimeters or smaller depending on sensor proximity and resolution); upload of existing grower-defined zones; providing a graph of plant nutrient availability and/or a map to enable tuning application(s) of nitrogen across multiple zones; output of scripts to drive machinery; tools for mass data entry and adjustment; and/or maps for data visualization, among others. "Mass data entry," in this context, may mean entering data once and then applying the same data to multiple fields and/or zones that have been defined in the system; example data may include nitrogen application data that is the same for many fields and/or zones of the same grower, but such mass data entry applies to the entry of any type of field data into the mobile computer application 200. For example, nitrogen instructions 210 may be programmed to accept definitions of nitrogen application and practices programs and to accept user input specifying to apply those programs across multiple fields. "Nitrogen application programs," in this context, refers to stored, named sets of data that associates: a name, color code or other identifier, one or more dates of application, types of material or product for each of the dates and amounts, method of application or incorporation such as injected or broadcast, and/or amounts or rates of application for each of the dates, crop or hybrid that is the subject of the application, among others. "Nitrogen practices programs," in this context, refer to stored, named sets of data that associates: a practices name; a previous crop; a tillage system; a date of primarily tillage; one or more previous tillage systems that were used; one or more indicators of application type, such as manure, that were used. Nitrogen instructions 210 also may be programmed to generate and cause displaying a nitrogen graph, which indicates projections of plant use of the specified nitrogen and whether a surplus or shortfall is predicted; in some embodiments, different color indicators may signal a magnitude of surplus or magnitude of shortfall. In one embodiment, a nitrogen graph comprises a graphical display in a computer display device comprising a plurality of rows, each row associated with and identifying a field; data specifying what crop is planted in the field, the field size, the field location, and a graphic representation of the field perimeter; in each row, a timeline by month with graphic indicators specifying each nitrogen application and amount at points correlated to month names; and numeric and/or colored indicators of surplus or shortfall, in which color indicates magnitude.

In one embodiment, the nitrogen graph may include one or more user input features, such as dials or slider bars, to dynamically change the nitrogen planting and practices programs so that a user may optimize his nitrogen graph. The user may then use his optimized nitrogen graph and the related nitrogen planting and practices programs to implement one or more scripts, including variable rate (VR) fertility scripts. Nitrogen instructions 210 also may be programmed to generate and cause displaying a nitrogen map, which indicates projections of plant use of the specified nitrogen and whether a surplus or shortfall is predicted; in some embodiments, different color indicators may signal a magnitude of surplus or magnitude of shortfall. The nitrogen map may display projections of plant use of the specified nitrogen and whether a surplus or shortfall is predicted for different times in the past and the future (such as daily, weekly, monthly or yearly) using numeric and/or colored indicators of surplus or shortfall, in which color indicates magnitude. In one embodiment, the nitrogen map may include one or more user input features, such as dials or slider bars, to dynamically change the nitrogen planting and practices programs so that a user may optimize his nitrogen map, such as to obtain a preferred amount of surplus or shortfall. The user may then use his optimized nitrogen map and the related nitrogen planting and practices programs to implement one or more scripts, including variable rate (VR) fertility scripts. In other embodiments, similar instructions to the nitrogen instructions 210 could be used for application of other nutrients (such as phosphorus and potassium), application of pesticide, and irrigation programs.

In one embodiment, weather instructions 212 are programmed to provide field-specific recent weather data and forecasted weather information. This enables growers to save time and have an efficient integrated display with respect to daily operational decisions.

In one embodiment, field health instructions 214 are programmed to provide timely remote sensing images highlighting in-season crop variation and potential concerns. Example programmed functions include cloud checking, to identify possible clouds or cloud shadows; determining nitrogen indices based on field images; graphical visualization of scouting layers, including, for example, those related to field health, and viewing and/or sharing of scouting notes; and/or downloading satellite images from multiple sources and prioritizing the images for the grower, among others.

In one embodiment, performance instructions 216 are programmed to provide reports, analysis, and insight tools using on-farm data for evaluation, insights and decisions. This enables the grower to seek improved outcomes for the next year through fact-based conclusions about why return on investment was at prior levels, and insight into yield-limiting factors. The performance instructions 216 may be programmed to communicate via the network(s) 109 to back-end analytics programs executed at agricultural intelligence computer system 130 and/or external data server computer 108 and configured to analyze metrics such as yield, yield differential, hybrid, population, SSURGO zone, soil test properties, or elevation, among others. Programmed reports and analysis may include yield variability analysis, treatment effect estimation, benchmarking of yield and other metrics against other growers based on anonymized data collected from many growers, or data for seeds and planting, among others.

Applications having instructions configured in this way may be implemented for different computing device platforms while retaining the same general user interface appearance. For example, the mobile application may be programmed for execution on tablets, smartphones, or server computers that are accessed using browsers at client computers. Further, the mobile application as configured for tablet computers or smartphones may provide a full app experience or a cab app experience that is suitable for the display and processing capabilities of cab computer 115. For example, referring now to view (b) of FIG. 2, in one embodiment a cab computer application 220 may comprise maps-cab instructions 222, remote view instructions 224, data collect and transfer instructions 226, machine alerts instructions 228, script transfer instructions 230, and scouting-cab instructions 232. The code base for the instructions of view (b) may be the same as for view (a) and executables implementing the code may be programmed to detect the type of platform on which they are executing and to expose, through a graphical user interface, only those functions that are appropriate to a cab platform or full platform. This approach enables the system to recognize the distinctly different user experience that is appropriate for an in-cab environment and the different technology environment of the cab. The maps-cab instructions 222 may be programmed to provide map views of fields, farms or regions that are useful in directing machine operation. The remote view instructions 224 may be programmed to turn on, manage, and provide views of machine activity in real-time or near real-time to other computing devices connected to the system 130 via wireless networks, wired connectors or adapters, and the like. The data collect and transfer instructions 226 may be programmed to turn on, manage, and provide transfer of data collected at sensors and controllers to the system 130 via wireless networks, wired connectors or adapters, and the like. The machine alerts instructions 228 may be programmed to detect issues with operations of the machine or tools that are associated with the cab and generate operator alerts. The script transfer instructions 230 may be configured to transfer in scripts of instructions that are configured to direct machine operations or the collection of data. The scouting-cab instructions 232 may be programmed to display location-based alerts and information received from the system 130 based on the location of the field manager computing device 104, agricultural apparatus 111, or sensors 112 in the field and ingest, manage, and provide transfer of location-based scouting observations to the system 130 based on the location of the agricultural apparatus 111 or sensors 112 in the field.

2.3. Data Ingest to the Computer System

In an embodiment, external data server computer 108 stores external data 110, including soil data representing soil composition for the one or more fields and weather data representing temperature and precipitation on the one or more fields. The weather data may include past and present weather data as well as forecasts for future weather data. In an embodiment, external data server computer 108 comprises a plurality of servers hosted by different entities. For example, a first server may contain soil composition data while a second server may include weather data. Additionally, soil composition data may be stored in multiple servers. For example, one server may store data representing percentage of sand, silt, and clay in the soil while a second server may store data representing percentage of organic matter (OM) in the soil.

In an embodiment, remote sensor 112 comprises one or more sensors that are programmed or configured to produce one or more observations. Remote sensor 112 may be aerial sensors, such as satellites, vehicle sensors, planting equipment sensors, tillage sensors, fertilizer or insecticide application sensors, harvester sensors, and any other implement capable of receiving data from the one or more fields. In an embodiment, application controller 114 is programmed or configured to receive instructions from agricultural intelligence computer system 130. Application controller 114 may also be programmed or configured to control an operating parameter of an agricultural vehicle or implement. For example, an application controller may be programmed or configured to control an operating parameter of a vehicle, such as a tractor, planting equipment, tillage equipment, fertilizer or insecticide equipment, harvester equipment, or other farm implements such as a water valve. Other embodiments may use any combination of sensors and controllers, of which the following are merely selected examples.

The system 130 may obtain or ingest data under user 102 control, on a mass basis from a large number of growers who have contributed data to a shared database system. This form of obtaining data may be termed "manual data ingest" as one or more user-controlled computer operations are requested or triggered to obtain data for use by the system 130. As an example, the CLIMATE FIELDVIEW application, commercially available from The Climate Corporation, San Francisco, Calif., may be operated to export data to system 130 for storing in the repository 160.

For example, seed monitor systems can both control planter apparatus components and obtain planting data, including signals from seed sensors via a signal harness that comprises a CAN backbone and point-to-point connections for registration and/or diagnostics. Seed monitor systems can be programmed or configured to display seed spacing, population and other information to the user via the cab computer 115 or other devices within the system 130. Examples are disclosed in U.S. Pat. No. 8,738,243 and US Pat. Pub. 20150094916, and the present disclosure assumes knowledge of those other patent disclosures.

Likewise, yield monitor systems may contain yield sensors for harvester apparatus that send yield measurement data to the cab computer 115 or other devices within the system 130. Yield monitor systems may utilize one or more remote sensors 112 to obtain grain moisture measurements in a combine or other harvester and transmit these measurements to the user via the cab computer 115 or other devices within the system 130.

In an embodiment, examples of sensors 112 that may be used with any moving vehicle or apparatus of the type described elsewhere herein include kinematic sensors and position sensors. Kinematic sensors may comprise any of speed sensors such as radar or wheel speed sensors, accelerometers, or gyros. Position sensors may comprise GPS receivers or transceivers, or Wi-Fi-based position or mapping apps that are programmed to determine location based upon nearby Wi-Fi hotspots, among others.

In an embodiment, examples of sensors 112 that may be used with tractors or other moving vehicles include engine speed sensors, fuel consumption sensors, area counters or distance counters that interact with GPS or radar signals, PTO (power take-off) speed sensors, tractor hydraulics sensors configured to detect hydraulics parameters such as pressure or flow, and/or and hydraulic pump speed, wheel speed sensors or wheel slippage sensors. In an embodiment, examples of controllers 114 that may be used with tractors include hydraulic directional controllers, pressure controllers, and/or flow controllers; hydraulic pump speed controllers; speed controllers or governors; hitch position controllers; or wheel position controllers provide automatic steering.

In an embodiment, examples of sensors 112 that may be used with seed planting equipment such as planters, drills, or air seeders include seed sensors, which may be optical, electromagnetic, or impact sensors; downforce sensors such as load pins, load cells, pressure sensors; soil property sensors such as reflectivity sensors, moisture sensors, electrical conductivity sensors, optical residue sensors, or temperature sensors; component operating criteria sensors such as planting depth sensors, downforce cylinder pressure sensors, seed disc speed sensors, seed drive motor encoders, seed conveyor system speed sensors, or vacuum level sensors; or pesticide application sensors such as optical or other electromagnetic sensors, or impact sensors. In an embodiment, examples of controllers 114 that may be used with such seed planting equipment include: toolbar fold controllers, such as controllers for valves associated with hydraulic cylinders; downforce controllers, such as controllers for valves associated with pneumatic cylinders, airbags, or hydraulic cylinders, and programmed for applying downforce to individual row units or an entire planter frame; planting depth controllers, such as linear actuators; metering controllers, such as electric seed meter drive motors, hydraulic seed meter drive motors, or swath control clutches; hybrid selection controllers, such as seed meter drive motors, or other actuators programmed for selectively allowing or preventing seed or an air-seed mixture from delivering seed to or from seed meters or central bulk hoppers; metering controllers, such as electric seed meter drive motors, or hydraulic seed meter drive motors; seed conveyor system controllers, such as controllers for a belt seed delivery conveyor motor; marker controllers, such as a controller for a pneumatic or hydraulic actuator; or pesticide application rate controllers, such as metering drive controllers, orifice size or position controllers.

In an embodiment, examples of sensors 112 that may be used with tillage equipment include position sensors for tools such as shanks or discs; tool position sensors for such tools that are configured to detect depth, gang angle, or lateral spacing; downforce sensors; or draft force sensors. In an embodiment, examples of controllers 114 that may be used with tillage equipment include downforce controllers or tool position controllers, such as controllers configured to control tool depth, gang angle, or lateral spacing.

In an embodiment, examples of sensors 112 that may be used in relation to apparatus for applying fertilizer, insecticide, fungicide and the like, such as on-planter starter fertilizer systems, subsoil fertilizer applicators, or fertilizer sprayers, include: fluid system criteria sensors, such as flow sensors or pressure sensors; sensors indicating which spray head valves or fluid line valves are open; sensors associated with tanks, such as fill level sensors; sectional or system-wide supply line sensors, or row-specific supply line sensors; or kinematic sensors such as accelerometers disposed on sprayer booms. In an embodiment, examples of controllers 114 that may be used with such apparatus include pump speed controllers; valve controllers that are programmed to control pressure, flow, direction, PWM and the like; or position actuators, such as for boom height, subsoiler depth, or boom position.

In an embodiment, examples of sensors 112 that may be used with harvesters include yield monitors, such as impact plate strain gauges or position sensors, capacitive flow sensors, load sensors, weight sensors, or torque sensors associated with elevators or augers, or optical or other electromagnetic grain height sensors; grain moisture sensors, such as capacitive sensors; grain loss sensors, including impact, optical, or capacitive sensors; header operating criteria sensors such as header height, header type, deck plate gap, feeder speed, and reel speed sensors; separator operating criteria sensors, such as concave clearance, rotor speed, shoe clearance, or chaffer clearance sensors; auger sensors for position, operation, or speed; or engine speed sensors. In an embodiment, examples of controllers 114 that may be used with harvesters include header operating criteria controllers for elements such as header height, header type, deck plate gap, feeder speed, or reel speed; separator operating criteria controllers for features such as concave clearance, rotor speed, shoe clearance, or chaffer clearance; or controllers for auger position, operation, or speed.

In an embodiment, examples of sensors 112 that may be used with grain carts include weight sensors, or sensors for auger position, operation, or speed. In an embodiment, examples of controllers 114 that may be used with grain carts include controllers for auger position, operation, or speed.

In an embodiment, examples of sensors 112 and controllers 114 may be installed in unmanned aerial vehicle (UAV) apparatus or "drones." Such sensors may include cameras with detectors effective for any range of the electromagnetic spectrum including visible light, infrared, ultraviolet, near-infrared (NIR), and the like; accelerometers; altimeters; temperature sensors; humidity sensors; pitot tube sensors or other airspeed or wind velocity sensors; battery life sensors; or radar emitters and reflected radar energy detection apparatus; other electromagnetic radiation emitters and reflected electromagnetic radiation detection apparatus. Such controllers may include guidance or motor control apparatus, control surface controllers, camera controllers, or controllers programmed to turn on, operate, obtain data from, manage and configure any of the foregoing sensors. Examples are disclosed in U.S. patent application Ser. No. 14/831,165 and the present disclosure assumes knowledge of that other patent disclosure.

In an embodiment, sensors 112 and controllers 114 may be affixed to soil sampling and measurement apparatus that is configured or programmed to sample soil and perform soil chemistry tests, soil moisture tests, and other tests pertaining to soil. For example, the apparatus disclosed in U.S. Pat. Nos. 8,767,194 and 8,712,148 may be used, and the present disclosure assumes knowledge of those patent disclosures.

In an embodiment, sensors 112 and controllers 114 may comprise weather devices for monitoring weather conditions of fields. For example, the apparatus disclosed in U.S. Provisional Application No. 62/154,207, filed on Apr. 29, 2015, U.S. Provisional Application No. 62/175,160, filed on Jun. 12, 2015, U.S. Provisional Application No. 62/198,060, filed on Jul. 28, 2015, and U.S. Provisional Application No. 62/220,852, filed on Sep. 18, 2015, may be used, and the present disclosure assumes knowledge of those patent disclosures.

2.4. Process Overview-Agronomic Model Training

In an embodiment, the agricultural intelligence computer system 130 is programmed or configured to create an agronomic model. In this context, an agronomic model is a data structure in memory of the agricultural intelligence computer system 130 that comprises field data 106, such as identification data and harvest data for one or more fields. The agronomic model may also comprise calculated agronomic properties which describe either conditions which may affect the growth of one or more crops on a field, or properties of the one or more crops, or both. Additionally, an agronomic model may comprise recommendations based on agronomic factors such as crop recommendations, irrigation recommendations, planting recommendations, fertilizer recommendations, fungicide recommendations, pesticide recommendations, harvesting recommendations and other crop management recommendations. The agronomic factors may also be used to estimate one or more crop related results, such as agronomic yield. The agronomic yield of a crop is an estimate of quantity of the crop that is produced, or in some examples the revenue or profit obtained from the produced crop.

In an embodiment, the agricultural intelligence computer system 130 may use a preconfigured agronomic model to calculate agronomic properties related to currently received location and crop information for one or more fields. The preconfigured agronomic model is based upon previously processed field data, including but not limited to, identification data, harvest data, fertilizer data, and weather data. The preconfigured agronomic model may have been cross validated to ensure accuracy of the model. Cross validation may include comparison to ground truthing that compares predicted results with actual results on a field, such as a comparison of precipitation estimate with a rain gauge or sensor providing weather data at the same or nearby location or an estimate of nitrogen content with a soil sample measurement.

Figure 3:
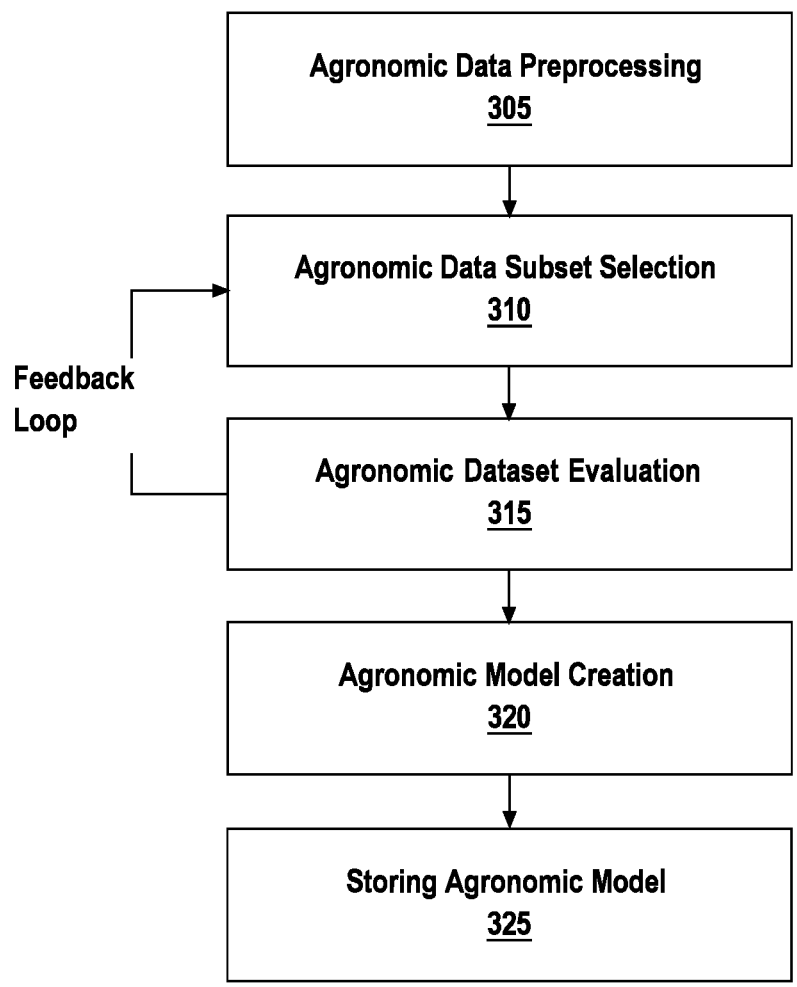
FIG. 3 illustrates a programmed process by which the agricultural intelligence computer system generates one or more preconfigured agronomic models using agronomic data provided by one or more data sources.

FIG. 3 illustrates a programmed process by which the agricultural intelligence computer system generates one or more preconfigured agronomic models using field data provided by one or more data sources. FIG. 3 may serve as an algorithm or instructions for programming the functional elements of the agricultural intelligence computer system 130 to perform the operations that are now described.

At block 305, the agricultural intelligence computer system 130 is configured or programmed to implement agronomic data preprocessing of field data received from one or more data sources. The field data received from one or more data sources may be preprocessed for the purpose of removing noise, distorting effects, and confounding factors within the agronomic data including measured outliers that could adversely affect received field data values. Embodiments of agronomic data preprocessing may include, but are not limited to, removing data values commonly associated with outlier data values, specific measured data points that are known to unnecessarily skew other data values, data smoothing, aggregation, or sampling techniques used to remove or reduce additive or multiplicative effects from noise, and other filtering or data derivation techniques used to provide clear distinctions between positive and negative data inputs.

At block 310, the agricultural intelligence computer system 130 is configured or programmed to perform data subset selection using the preprocessed field data in order to identify datasets useful for initial agronomic model generation. The agricultural intelligence computer system 130 may implement data subset selection techniques including, but not limited to, a genetic algorithm method, an all subset-models method, a sequential search method, a stepwise regression method, a particle swarm optimization method, and an ant colony optimization method. For example, a genetic algorithm selection technique uses an adaptive heuristic search algorithm, based on evolutionary principles of natural selection and genetics, to determine and evaluate datasets within the preprocessed agronomic data.

At block 315, the agricultural intelligence computer system 130 is configured or programmed to implement field dataset evaluation. In an embodiment, a specific field dataset is evaluated by creating an agronomic model and using specific quality thresholds for the created agronomic model. Agronomic models may be compared and/or validated using one or more comparison techniques, such as, but not limited to, root mean square error with leave-one-out cross validation (RMSECV), mean absolute error, and mean percentage error. For example, RMSECV can cross validate agronomic models by comparing predicted agronomic property values created by the agronomic model against historical agronomic property values collected and analyzed. In an embodiment, the agronomic dataset evaluation logic is used as a feedback loop, where agronomic datasets that do not meet configured quality thresholds are used during future data subset selection steps (block 310).

At block 320, the agricultural intelligence computer system 130 is configured or programmed to implement agronomic model creation based upon the cross validated agronomic datasets. In an embodiment, agronomic model creation may implement multivariate regression techniques to create preconfigured agronomic data models.

At block 325, the agricultural intelligence computer system 130 is configured or programmed to store the preconfigured agronomic data models for future field data evaluation.

2.5. Implementation Example—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 4 is a block diagram that illustrates a computer system 400 upon which an embodiment of the invention may be implemented. Computer system 400 includes a bus 402 or other communication mechanism for communicating information, and a hardware processor 404 coupled with bus 402 for processing information. Hardware processor 404 may be, for example, a general-purpose microprocessor.

Computer system 400 also includes a main memory 406, such as a random-access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory storage media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk, optical disk, or solid-state drive is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

Computer system 400 may implement the techniques described herein using customized hard-wired logic, one or more ASICs or FPGAs, firmware and/or program logic which in combination with the computer system causes or programs computer system 400 to be a special-purpose machine. According to one embodiment, the techniques herein are performed by computer system 400 in response to processor 404 executing one or more sequences of one or more instructions contained in main memory 406. Such instructions may be read into main memory 406 from another storage medium, such as storage device 410. Execution of the sequences of instructions contained in main memory 406 causes processor 404 to perform the process steps described herein. In alternative embodiments, hardwired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 410. Volatile media includes dynamic memory, such as main memory 406. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 402. Transmission media can also take the form of acoustic or light waves, such as those generated during radio-wave and infrared data communications.

Various forms of media may be involved in carrying one or more sequences of one or more instructions to processor 404 for execution. For example, the instructions may initially be carried on a magnetic disk or solid-state drive of a remote computer. The remote computer can load the instructions into its dynamic memory and send the instructions over a telephone line using a modem. A modem local to computer system 400 can receive the data on the telephone line and use an infrared transmitter to convert the data to an infrared signal. An infrared detector can receive the data carried in the infrared signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated-services digital network (ISDN) card, cable modem, satellite modem, or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives electrical, electromagnetic or optical signals that carry digital data streams representing various types of information.

Network link 420 typically provides data communication through one or more networks to other data devices. For example, network link 420 may provide a connection through local network 422 to a host computer 424 or to data equipment operated by an Internet Service Provider (ISP) 426. ISP 426 in turn provides data communication services through the world-wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are example forms of transmission media.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418.

The received code may be executed by processor 404 as it is received, and/or stored in storage device 410, or other non-volatile storage for later execution.

3. System for Executing Machine Learning Algorithms

In an embodiment, a computer system for executing machine learning algorithms comprises hardware and software that is programmed for executing various machine-based models. In some embodiments, independent components can be selected, modified, and grouped to form combinations of components that are configured to support the execution of the models. The components may be combined to form sequential, parallel, or mixed combinations that can facilitate execution of the models. This may be illustrated using the following example: assume that a model repository includes components that implement various processes for cultivating corn and various processes for estimating corn growing cycles. Furthermore, assume that a model execution infrastructure includes a set of CPUs, a set of memory units, storage devices, communications buses, and communications networks. Using the components from the model repository, a crop grower may select, or build, a model that is configured to determine how much nitrogen is recommended for an agricultural field to achieve the highest possible harvest of corn from the field, or when and how the field should be fertilized, or what corn type should be planted, or how many days it may take for corn to mature in the field. The crop grower may provide, to the model, input that specifies information about the soil, climate, and location of the field. Then, the grower may request execution of the model on the model execution infrastructure and over the provided input to generate output. The output may include nitrogen and corn type recommendations for the field. The output may also include predictions of the corn harvest date, and so forth.

Figure 7A:
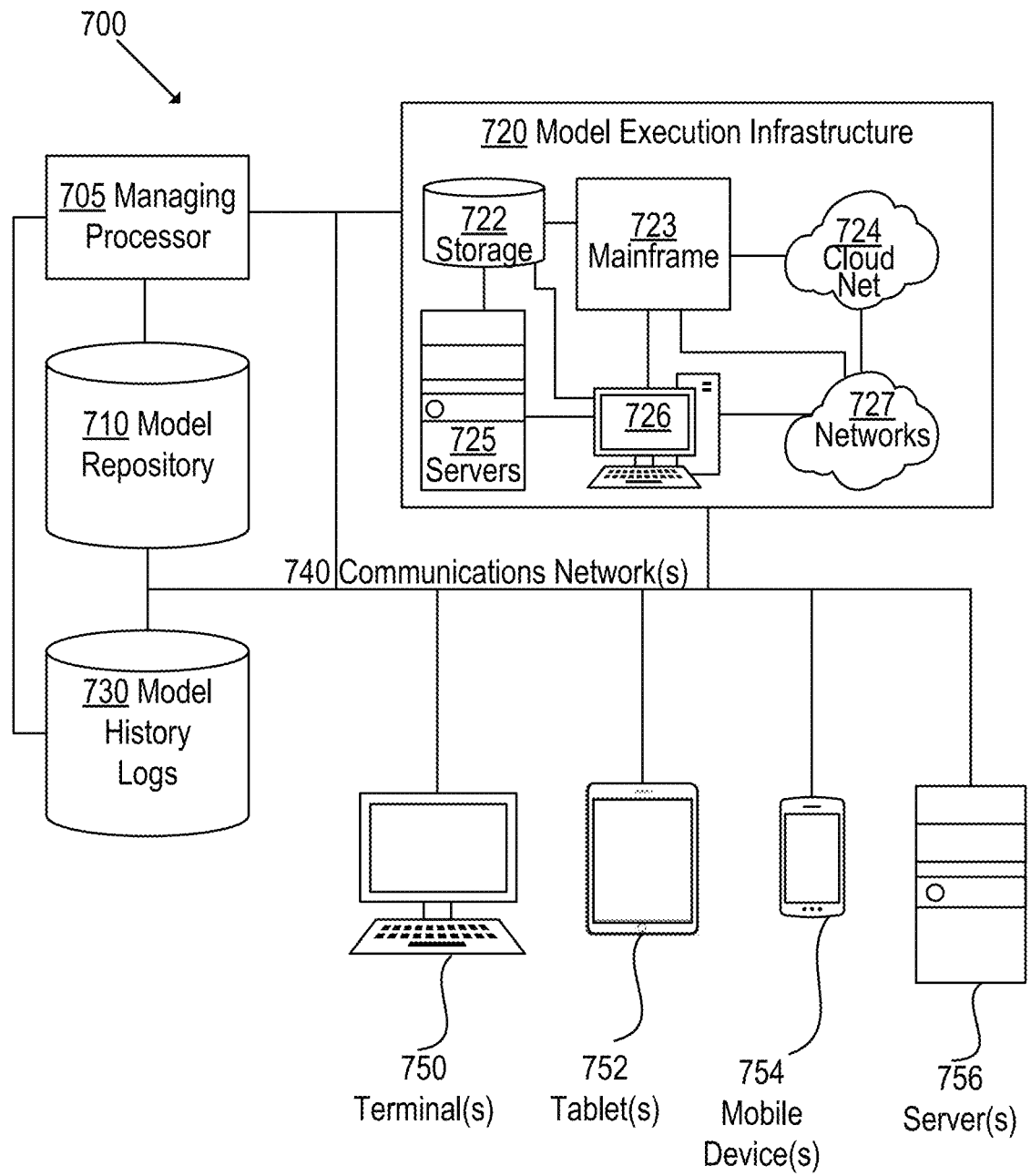
FIG. 7A depicts an example computer-based platform for executing machine learning algorithms.

FIG. 7A depicts an example computer-based platform 700 for executing machine learning algorithms. In the depicted example, platform 700 includes a managing processor 705, a model repository 710, a model execution infrastructure 720, and a model history log(s) 730. Managing processor 705 may be implemented in any type of computing device configured to receive, process, and transmit data.

In an embodiment, infrastructure 720 includes one or more storage devices 722, one or more cloud system computers 723, one or more cloud-based networks 724, one or more computer servers 725, one or more computer workstations 726, and one or more communications networks 727. Model execution infrastructure 720 is described in detail in FIG. 8A. In other embodiments, infrastructure 720 includes fewer or additional components.

Access to platform 700 may be facilitated via one or more communications networks 740 and one or more computing devices, such as terminals 750, tablets 752, mobile devices 754, server computers 756, and other computing devices (not depicted in FIG. 7A) such as cloud storages, cloud-based networks, and so forth, configured to transmit and receive data. In other embodiments, platform 700 may include fewer or more devices.

In an embodiment, platform 700 is configured to catalog, define, and organize various machine-based models, store them in repository 710, execute them on model execution infrastructure 720, and log the execution data of the models in model history log 730. Platform 700 outperforms other platforms known in the industry for building and storing models in terms of providing the comprehensive and extensive capabilities (described below) for keeping track of models, managing the models' modifications and executions, and making the models' history and logs available to users. For example, platform 700 provides comprehensive versioning capabilities for tracking versions, modification, and runtime characteristics of the models, and comprehensive cataloging capabilities for browsing and querying the models and their definitions.

In an embodiment, model repository 710 is configured to store and catalog definitions and metadata of machine-based models. The definitions of a model describe characteristics specific to the models, while the metadata associated with the models describes the models' usage and execution characteristics.

In an embodiment, model execution infrastructure 720 provides the capabilities to abstract the model execution and model inputs, so that infrastructure 720 may be reused for executing various models.

In an embodiment, model history log 730 is configured to store history logs of execution of the models. The logs may be useful in reverting the older or different versions of a model, executing different versions of the same model and comparing the results generated by the different versions of the model. Model history log 730 allows storing metrics about the executions of various models on the same or different components of model execution infrastructure 720 and on different input data. This may be useful in performing a historical analysis of the runtime metrics, expected accuracy metrics, and expected execution duration metrics for the models.

3.1. Example Model Repository

In an embodiment, model repository 710 is a computer-based database configured to store information about machine-learning models. Model repository 710 may be used to store various types of models, and various types of information for each of the models.

Figure 7B:
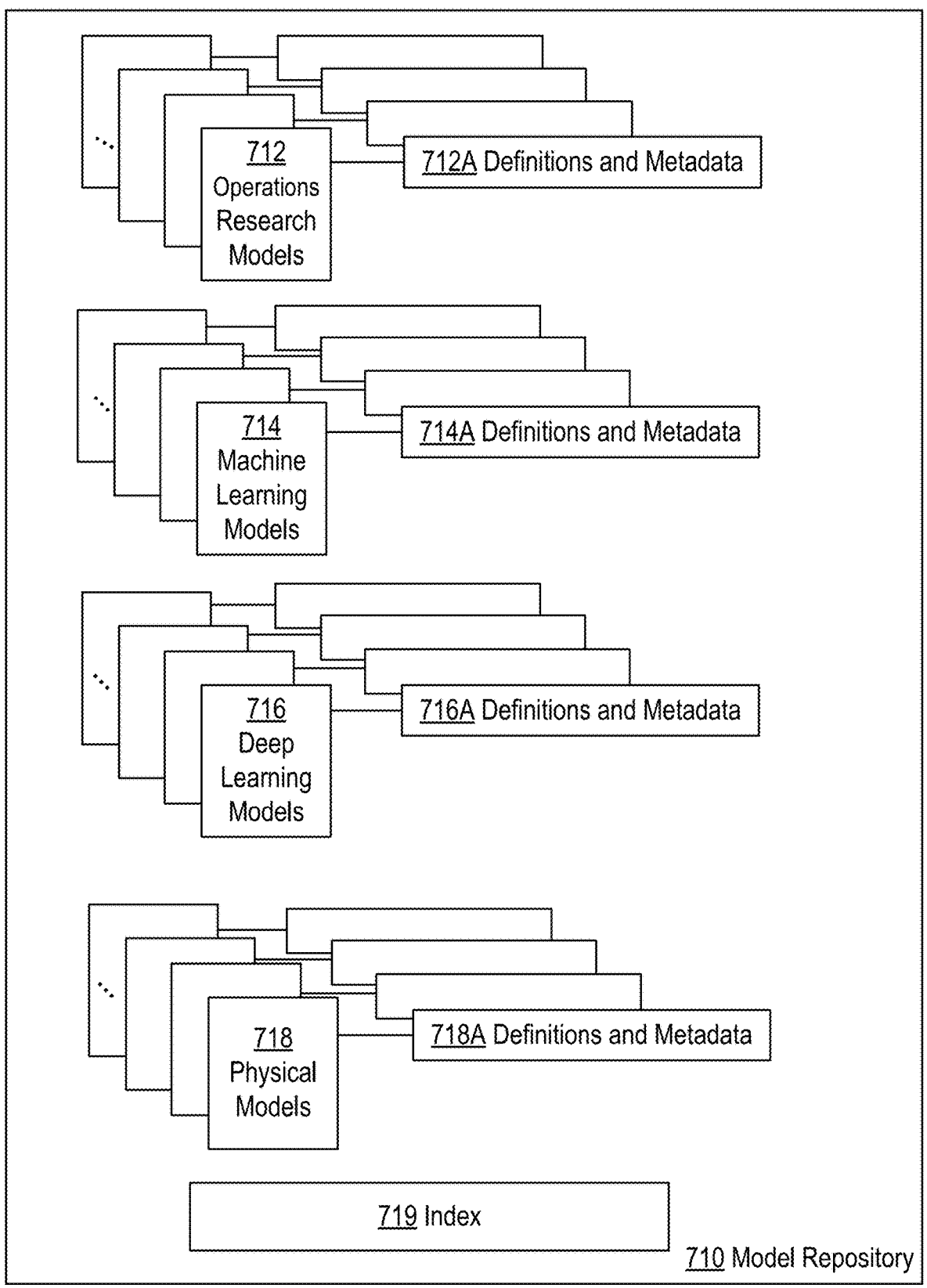
FIG. 7B depicts an example computer-based model repository.

FIG. 7B depicts an example computer-based model repository 710. In the depicted example, repository 710 includes examples of machine-based models that may be useful in agricultural applications. Repository 710 may also include other models that are not depicted in FIG. 7B. The models stored in repository 710 may be indexed, organized and categorized. The index to the models may be stored in an index data structure 719, which may be organized using data pointers, data tables, and others.

In the context of agricultural applications, examples of machine-based models may include operation research models 712, machine learning models 714, deep learning models 716, and physical models 718.

Although not depicted in FIG. 7B, the machine-based models may include models that are specific to non-agricultural applications, such as human resources models, billing models, and the like.

Operation research models 712 are specialized models that are configured to process complex mathematical equations to solve optimization problems. Usually, operation research models 712 deal with constraint-based programming. An operation research model may accept input that includes one or more constraints. Upon receiving the input, the model may execute an optimization algorithm to derive a solution that optimizes the inputted values for the constraints. An operation research model may be used to optimize, for example, a count of employees and a count of robot machines in a genetics laboratory that is needed to process genetics-related data in the shortest time period possible.

Operation research models 712 have a wide applicability in agricultural technology to optimize seed planting schedules, optimize fertilization schedules, and optimize harvesting schedules. Operation research models 712 may be also applicable in logistics and shipping.

Machine learning models 714 usually include artificial intelligence ("AI") models. They are typically used to learn behaviors of a system, and based on the learned behaviors of the system, predict reactions of the system to new inputs and data. Machine learning models 714 may be custom build and customized to specific systems and specific tasks.

Machine learning models 714 are widely applicable in agricultural technology. For example, a machine learning model may be trained on a set of pictures of plants that exhibit some plant diseases. The training may include assigning the names of the diseases to the pictures. For example, the training may include developing associations between the diseases' characteristics depicted in the pictures and the names of the diseases. Once the model is trained, the model is deployed and may be used to recognize plant diseases depicted in user-provided photographs of plants.

Deep learning models 716 include machine-learning models that are usually more advanced and more sophisticated than machine learning models 714. Deep learning models 716 may use, for example, random-forest algorithms, linear regression algorithms, neural network algorithms, and other complex algorithms.

Physical models 718 are physical models of software components that may be executed in model execution infrastructure 720. For example, physical models 718 may include software libraries, instructions and programmable calls that can be combined and selected to form an executable of a particular model, such as an operation research model, a machine learning model, or a deep learning model.

Models stored in model repository 710 are usually stored in associations with their respective definitions and metadata. Each of the models may be associated with its own set of definitions and its own metadata. Hence, each of operation research models 712 may have its own definitions and metadata 712A, each of machine learning models 714 may have its own definitions and metadata 714A, each of deep learning models 716 may have its own definitions and metadata 716A, and each of physical models 718 may have its own definitions and metadata 718A.

Figure 7C:
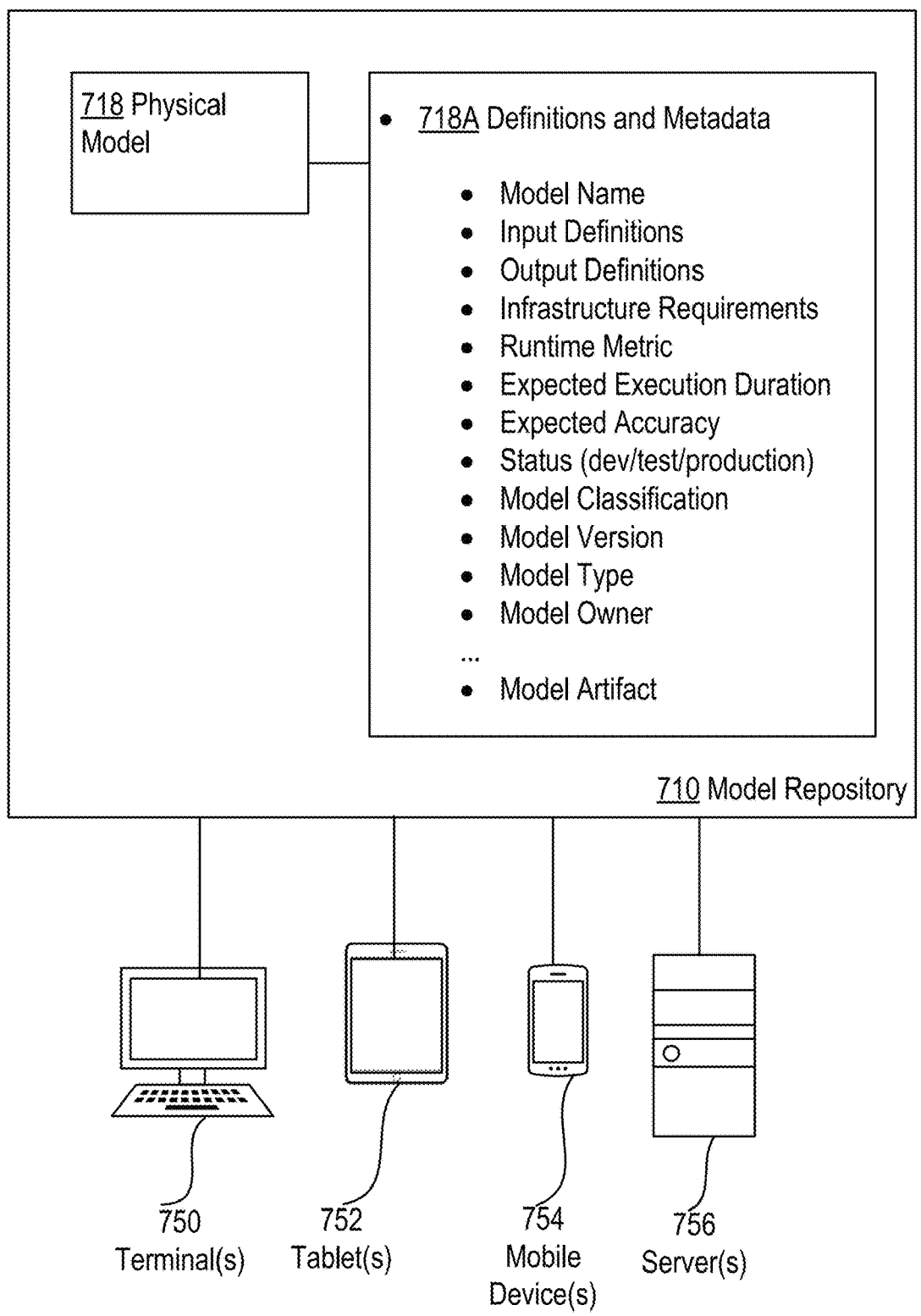
FIG. 7C depicts example data structures maintained by a computer-based model repository.

FIG. 7C depicts example data structures maintained by a computer-based model repository. The depicted example shows an example physical model data structure 718B and a definitions and metadata structure 718BB that are associated with example physical model 718A (shown in FIG. 7B). Although FIG. 7C depicts the example data structures only for a physical model, other models may have similar data structures stored in model repository 710.

As shown in FIG. 7C, model repository 710 may store, for a physical model 718, physical model data structure 718A. Data structure 718A may be used to store definitions and metadata associated with physical model 718.

Data structure 718A may be used to store definitions and metadata associated with physical model 718. Definitions usually pertain to static characteristics of a model, while metadata usually pertains to characteristics that are related to execution of the model. The distinction between the definitions and the metadata may be unclear in some situations because both the definitions and the metadata may pertain to, for example, an expected runtime metrics, and the like. For example, an expected runtime metrics may be described in both: the definitions and the metadata.

In the example depicted in FIG. 7C, definitions and metadata 718A include a model name, input definitions, output definitions, infrastructure requirements, runtime metric, expected execution duration, expected accuracy, status (such as development status, test status, or production status), model classification, model version, model type, and model owner. In other examples, data structure 718A may include fewer or more elements.

In an embodiment, definitions and metadata 718A include model artifacts. An artifact is a binary file that is built for a machine-based model and that can be executed to model certain behaviors of systems. The binary file is usually built once the model is trained on training data. Once the training phase is completed, the trained model is captured in an actual binary file. The binary file includes executable instructions which, when performed by computer processors, cause the model to predict the system's behavior that is consistent with the training data. The binary file, i.e., the artifact, may be deployed into production, and executed in model execution infrastructure 720.

Elements included in definitions and metadata 718A for a machine-based model may vary and may depend on the type of the model and whether the model has been executed or modified. For example, the definitions and metadata associated with a machine learning model usually will include the model's specific type, the model's quality metrics, and the model's expected accuracy. The model's expected accuracy may be expressed as a fraction, such as 95%, or similarly.

Data structures depicted in FIG. 7C may be created, queried, updated, and maintained by managing processor 705, described in FIG. 7A.

Access to data structures maintained in model repository 710 may be facilitated via one or more communications networks 740 (depicted in FIG. 7A, but not in FIG. 7C), and via one or more computing devices, such as terminals 750, tablets 752, mobile devices 754, server computers 756, and other computing devices configured to transmit and receive data.

Model repository 710 may be updated and modified. For example, new models may be added to model repository 710, and/or new versions of the models may be created and stored in the repository.

To create a new a machine-based model, or a new version of the model, a user or a manager may build the new model from the building blocks available in model repository 710. Once built, an initial definition is created and stored in model repository 710 for the new model to indicate that the new model is being developed. Once the new model is subjected to testing, another definition is created and stored in model repository 710 to indicate that the new model is being tested. Once the new model is deployed into production, other definitions are created and stored in model repository 710 for the new model to indicate that the new model is put into production. Each of the definitions may be stored in association with the new model itself, indexed using, for example, index 719 (shown in FIG. 7B), and made available for querying and for generating reports.

Once the new model is prepared for execution, other definition is created and stored in model repository 710 to indicate, for example, an expected execution duration, an expected accuracy, and execution infrastructure requirements.

Once the new model is subjected to execution, metadata is created and stored in model repository 710 for the model to indicate, for example, runtime metrics, status data, status indicators, and the like. In addition, an execution log for the new model is created and stored in model history log database 730.

When the new model is executed on new input data, new metadata is created and stored in model repository 710 for the model to indicate new runtime metrics, status data, status indicators, and the like. In addition, a new execution log for the model is created and stored in model history log database 730.

The process is repeated each time a model is created, modified, executed, or queried. Over time, model repository 710, model execution infrastructure 720 and model history log database 730 become a central warehouse that scientists, researchers and agricultural professionals can expand and test, and that crop growers can use and compare.

Figure 7D:
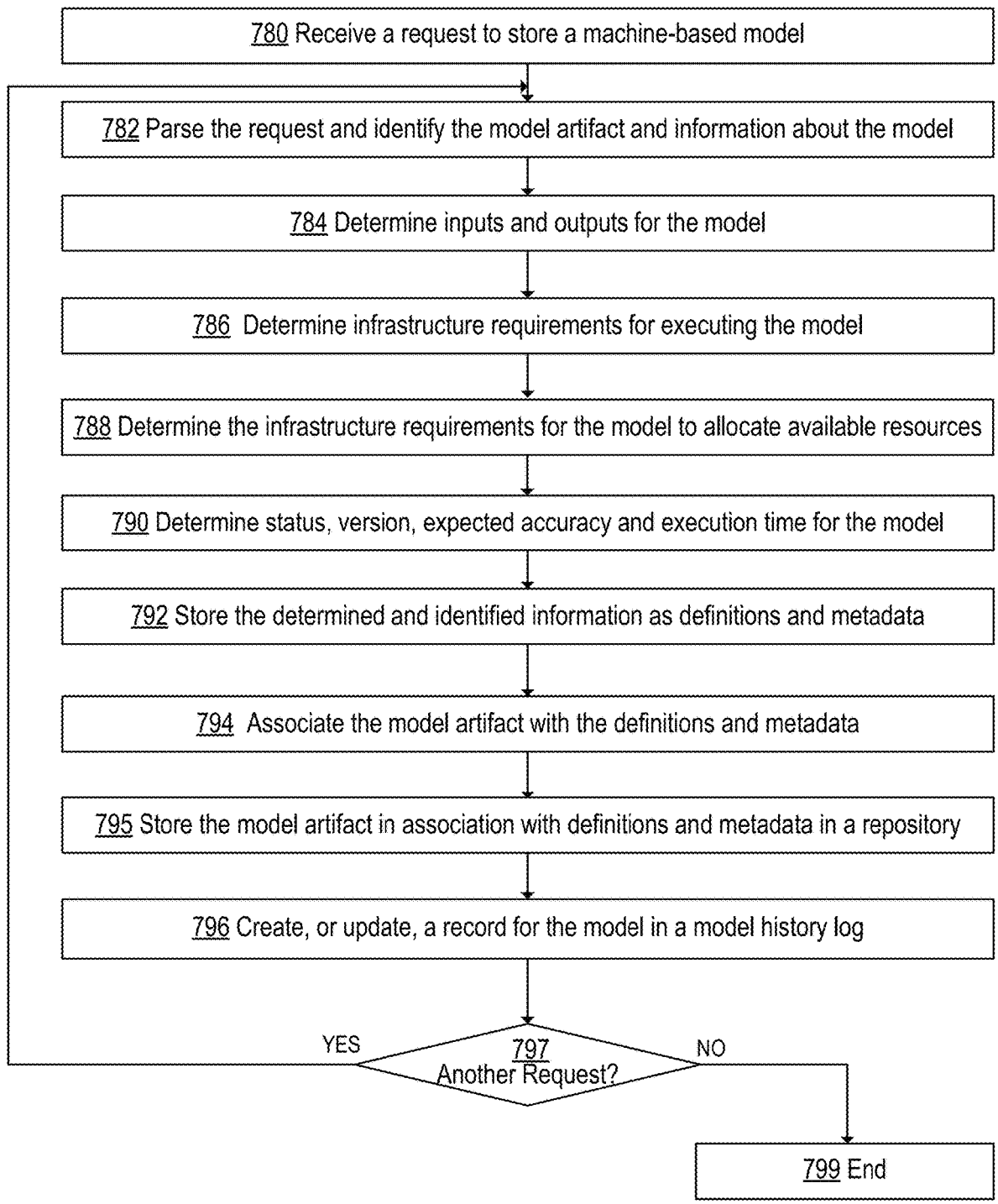
FIG. 7D depicts an example flowchart for building, storing and cataloging a machine-based model.

FIG. 7D depicts an example flowchart for building, storing, and cataloging a machine-based model. The example is provided to merely illustrate one of many ways of incorporating the model into repository 710 and one of many ways of integrating the model into platform 700. The depicted process may be executed by any computer-based processor, including managing processor 705, depicted in FIG. 7A.

In step 780, a computer-based processor receives a request to store a machine-based model. The request may be received from any of terminal devices, such devices 750-756, depicted in FIG. 7A, 7C.

In step 782, the processor parses the request and identifies the model artifact and information about the model. The artifact may be provided in the request itself; alternatively, the request may include a hyperlink pointing to a storage space at which the artifact is stored, and from which the artifact may be retrieved by the processor. Similarly, the information about the model may be included in the request itself, or the request may include a hyperlink pointing to a storage space from which the processor may retrieve the definitions and metadata for the model.

In step 784, the processor determines inputs for the model. The inputs and outputs may be provided by a user Alternatively, a hyperlink may be provided that points to a storage space from which the inputs/outputs may be retrieved. The inputs may include specific input values that, when provided to the model, are processed to generate output values, the inputs may include, for example, information about the soil, the climate, and the location of an agricultural field, and so forth. The outputs may include a request to provide recommendations for a type of fertilizer that, if applied to the field, would allow achieving maximum yield from the field.

In step 788, the processor determines infrastructure requirements for executing the model. The requirements may be already provided in the definitions associated with the model. Alternatively, the requirements may be obtained from model repository 710 that already stores records for the model, or stores data records for similar models. The requirements may include CPU specifications, memory requirements, storage requirements, and the like.

In step 790, the processor determines the status, version, expected accuracy, and estimated execution time for the model. This information may be already available in the definitions associated for the model. Alternatively, the information may be obtainable from model repository 710 that already stores records for the model, or stores records for similar models.

In step 792, the processor generates, or updates, definitions and metadata for the model and stores the updated definitions and the metadata in association with the model in model repository 710.

In step 794, the processor associates the model artifact with the definitions and metadata for the model. For example, the processor may create physical model data structure 718A for the model. The data structure 718A is described in FIG. 7C.

In step 795, the processor stores, in model repository 710, the association between the model artifact and the definitions and metadata for the model.

In step 796, the processor creates, or updates, a record in model history log database 730 for the model. This may include checking whether a record for the model has been already created, and if so, updating the record with the information included in the definitions and metadata. However, if the record for the model has not been created, then the processor may create the record in model history log database 730 and store the definitions and metadata for the model in the record.

If, in step 797, the processor received a new request, then the processor proceeds to step 782 to process the new request. Otherwise, the processor ends executing in step 799.

3.2. Example Model Execution Infrastructure

Figure 8A:
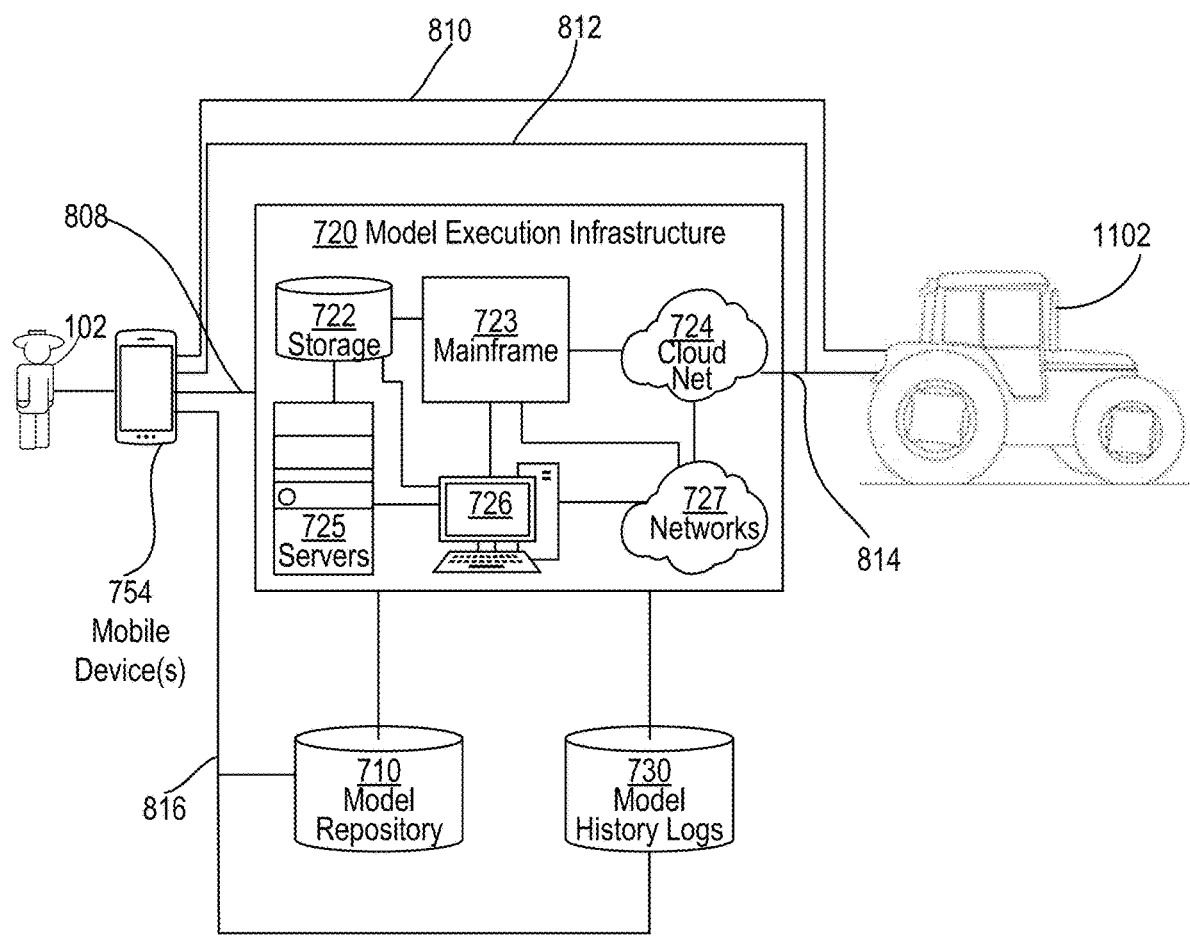
FIG. 8A depicts an example computer-based model execution infrastructure for executing machine learning algorithms.

FIG. 8A depicts an example computer-based model execution infrastructure 720 for executing machine learning algorithms.

In an embodiment, infrastructure 720 is a collection of hardware and software components that may be combined or used individually to facilitate execution of machine-based models stored in model repository 710. Infrastructure 720 may include, for example, computer processors, memory units, caches, communications buses, and computer-programmed instructions that collaboratively provide execution platforms for executing the models. The computer-programmed instructions may include instructions of operating systems, system calls, cross-platform application programming interfaces, programming libraries, and so forth.

Infrastructure 720 may be accessible via any type of computing devices. In the depicted example, infrastructure 720 is accessible to a user 102 from a mobile device 754. Mobile device 754 may be configured to establish communications sessions and communicate (808) with various components of infrastructure 720, as well as communicate (810) with physical machines 1102 and communicate (816) with model repository 710 and model history log database 730. Infrastructure 720 may provide (812) recommendations to mobile device 754. Infrastructure 720 may be also configured to provide (814) instructions to machines 1102 such as tractors, combines, planters, seeders, and the like.

In an embodiment, user 102 provides input to infrastructure 720 to cause infrastructure 720 to derive agricultural recommendations for a field based on the input, to cause infrastructure 720 to transmit the recommendations to user 102 and/or to transmit the recommendations directly to agricultural machine 1102 to cause machine 1102 to cultivate the field according to the recommendations obtained from infrastructure 720. For example, upon receiving a request from user 102 for agricultural recommendations for a field, mobile device 754 communicates (808) the request to model execution infrastructure 720, and infrastructure 720 selects a particular machine model, or allows user 102 to select a particular machine model from model repository 710. Once execution of the particular machine model is completed and the recommendations are generated, infrastructure transmits (814) the recommendations directly to machine 1102 and transmits (812) the recommendations directly to mobile device 754. Upon receiving the recommendations from infrastructure 720, a computer implemented in machine 102 uses the recommendations to generate instructions and causes machine 102 to execute the instructions to cultivate the field. The communication (808) of the request to infrastructure 720, communication (814) of the recommendations to machine 1102 and communication (812) of the recommendations to mobile device 754 may be performed in real-time.

Users may also access infrastructure 720 via terminals 750, tablets 752, server computers 756 (shown in FIG. 7A, but not depicted in FIG. 8A), and other computing devices configured to transmit and receive data.

In an embodiment, infrastructure 720 includes one or more storage devices 722, one or more cloud system computers 723, one or more cloud-based networks 724, one or more computer servers 725, one or more computer workstations 726, and one or more communications networks 727. Each device 722-723, 725, and 726 may include one or more computer processors, one or more memory units, one or more caches, and one or more communications busses. The processors included in devices 722-723, 725, and 726 may vary and may have different processing capabilities. Similarly, the memory units included in devices 722-723, 725, and 726 may vary and may have different storing and processing capabilities.

Each device 722-723, 725, and 726 may store computer-programmed instructions which, when executed on computer processors, cause the processors to execute machine-learning models stored in model repository 710. Furthermore, each device 722-723, 725, and 726 may store computer-programmed instructions which, when executed on computer processors, cause the processors to store information about the models in model repository 710 and store information about the execution of the models in model history log database 730.

Devices 722-723, 725, and 726 may be standalone computing devices. Alternatively, some or all devices 722-723, 725, and 726 may be implemented as distributed systems. The distributed systems may be part of cloud network 724, and the components of the distributed systems may communicate with each other via one or more communications networks 727.

In an embodiment, model execution infrastructure 720 includes components that are configured to establish communications with other systems not depicted in FIG. 8A. For example, server 725 may be configured to establish communications connections with a GPS system (not depicted in FIG. 8A) to obtain geographical positioning information that may be used as input to a machine-learning model. Once server 725 establishes a communications connection with, for example, a satellite-based GPS system (not depicted in FIG. 8A), server 725 may track positions and movements of a mobile device 754 that user 102 is using. Server 725 may also track positions and movements of tractor 1102 as tractor 1102 traverses an agricultural field and plants seeds onto the field.

Components of model execution infrastructure 720 may include generic components, customized components, or both generic and customized components. The components may be used and re-used to provide execution platforms for executing and re-executing various models.

When possible, some components may be interchangeable. For example, if executing a model on a dual core processor fails to meet the expected execution time requirement, then another processor, such as a quad core processor, may be selected and used to execute the model in hope that using the quad core processor would shorten the execution time of the model.

Figure 8B:
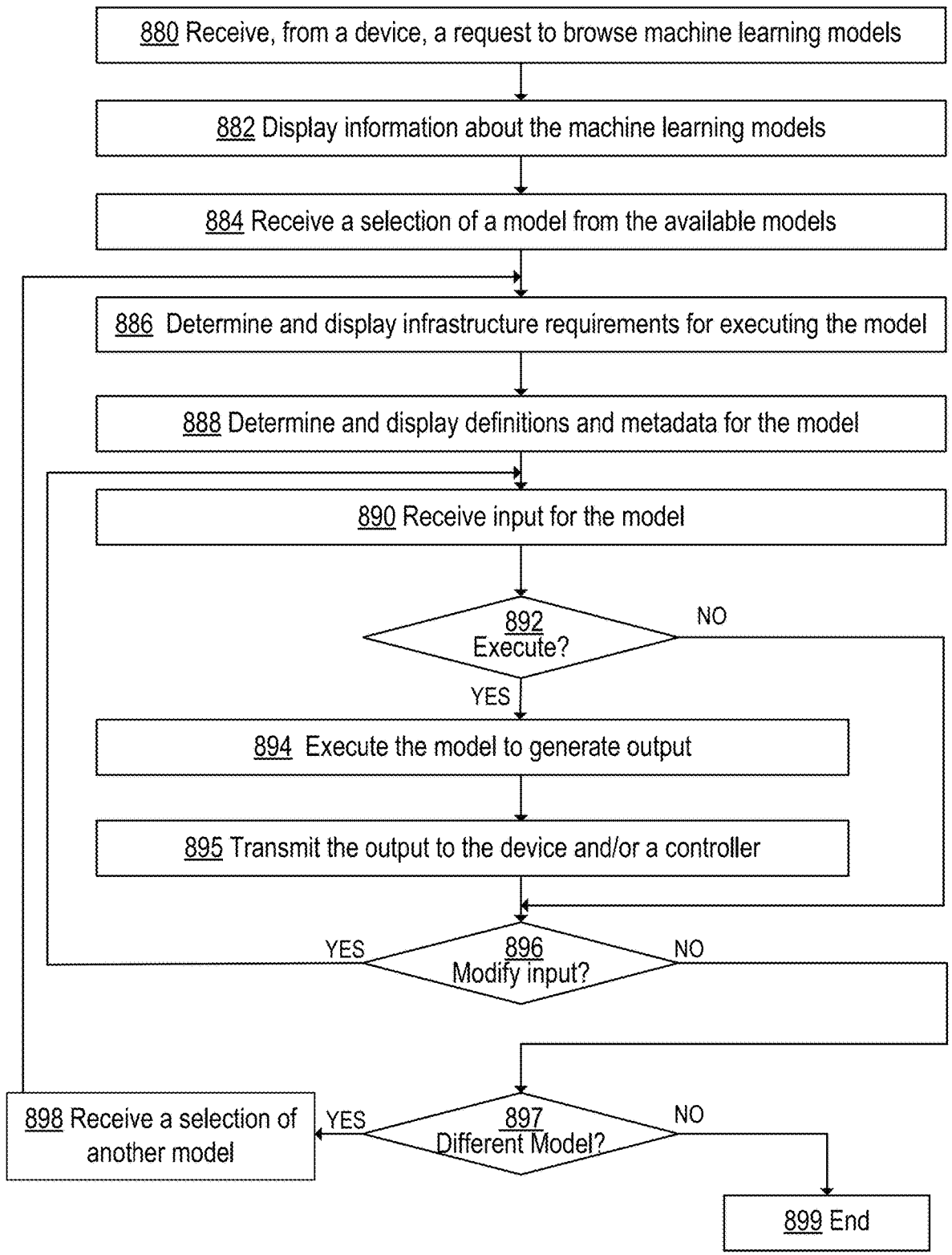
FIG. 8B depicts an example flowchart for selecting and executing an example machine learning model.

FIG. 8B depicts an example flowchart for selecting and executing an example machine learning model. The example is provided to merely illustrate one of many ways of selecting an execution infrastructure for a machine-based model, executing the model on the selected infrastructure, and making use of output generated by executing the model. The output generated by executing the model may be used to, for example, control an agricultural machine, such as tractor 1102 shown in FIG. 8A. The depicted process may be executed by any computer-based processor, including managing processor 705, depicted in FIG. 7A.

In step 880, a computer-based processor receives a request to browse machine learning models stored in model repository 710. The request may be received from, for example, mobile device 754 that is operated by user 102. User 102 may be a scientist who develops and tests the models, or a crop grower who wants to know what seeds he should plant on his fields to achieve high yield from the fields.

In step 882, the processor generates and displays information about the machine learning models that have been stored in model repository 710. This may include accessing model repository 710, retrieving the information about the models from the repository, generating a graphical representation of the retrieved information and sending the graphical representation to mobile device 754.

In some situations, the received request may provide some information that the processor may use to narrow down the information about the models that should be retrieved from model repository 710. For example, the request may specify that the user wants to see only operation research models or only deep learning models. According to another example, the request may specify that the user wants to see only the models that have been built or updated after a certain date, or that have been built specially for processing corn-related queries.

In step 884, the processor receives a selection of a model from a menu or a list of models available to the user. The selection may indicate the model by providing the model's name, identifier, or any other type of identification.

In step 886, the processor determines infrastructure requirements for executing the selected model. The requirements may specify, for example, the type of CPU that should be used to execute the selected model, or the storage space that needs to be allocated to execute the selected model. The requirements for the model may be retrieved from model repository 710, or more specifically from metadata stored in model repository 710 as associated with the selected model.

According to another example, the requirements may be extracted from the request itself. For example, the request may specify that the selected model needs to be executed on a quad core processor and that output generated by executing the selected model needs to be provided to tractor 1102.

Also, in this step, the processor may generate a graphical representation of the infrastructure requirements and may transmit the graphical representation to mobile device 754.

In step 888, the processor determines, or retrieves, definitions and metadata for the selected model. This may include accessing the definitions and metadata stored in model repository 710 for the selected model and retrieving the stored definitions and metadata. The definitions may be used to determine, for example, a version of the selected model, input definitions, output definitions, model type, model classification, and the like.

Also, in this step, the processor generates a graphical representation of the definitions and metadata for the selected model and transmits the graphical representation to mobile device 754. The graphical representation may include, for example, information of the types of inputs that may be provided to the model, and the types of outputs that the model may generate.

In step 890, the processor receives input to be used to execute the selected model. The input may include, for example, specific values that the model can accept. The specific values may include soil type information for an agricultural field, geographical location information for the field, the type of crop that is to be planted on the field, and the like.

If the received input meets the input definitions included in the definition data structure saved for the selected model in model repository 710, then the processor proceeds to performing step 892. Otherwise, the processor may repeat step 888 and re-display the input definitions of the inputs that the selected model accepts.

If, in step 892, the processor received an indication or a request to execute the selected model using the provided input, then the processor proceeds to performing step 894. Otherwise, the processor proceeds to performing step 896.

In step 894, the processor initiates execution of the selected model on the model infrastructure and using the input. Once the execution of the model is completed, the model generates output information, which is referred to herein as output. The output may include, for example, recommendations addressing the request received in step 880. For instance, if the request was for seeding recommendations, then the output may provide, as the recommendations, the type of seeds that is recommended for the agricultural field, and the timing for planting the seed to achieve the highest yield. The recommendations may also include instructions for planting the seeds, such as spacing instructions for the seed planting.

In step 895, the processor transmits the output to, for example, mobile device 754. The output may be also transmitted to a computer or a controller that controls a mechanical machine, such as tractor 1102. For example, if the output includes seed planting instruction for planting the seeds using an agricultural seeder, then the output may be directly transmitted to a controller installed on the seeder to adjust the spacing between the seed disposing pipes before the seeder starts the seeding process.

If, in step 896, the processor determines that a request to modify the inputs for the model is received, then the processor proceeds to executing step 890. Otherwise, the processor proceeds to executing step 897.

If, in step 897, the processor determines that a request to select a different model is received, then the processor proceeds to executing step 898; otherwise, the processor stops executing in step 899.

In step 898, the processor receives a selection of another model, and then proceeds to executing step 886, in which the processor determines infrastructure requirements for the newly selected model.

The process is repeated each time the processor receives a request to select and execute a machine-based model. The requests may be sent from scientists who, for example, develop and test new machine-based models, or who develop and enhance platform 700. The requests may be also received from crop growers who, for example, seek recommendations to improve their agricultural practices for their fields.

3.3. Example Model History Log

In an embodiment, model history log 730 is used to store specific inputs and outputs for execution of machine-based models. For example, if a deep learning module is added to model repository 710, then a record is created in model history log 730 for the model. The inputs that the model is configured to accept and the outputs that the model can generate are stored in the record in model history log 730. When the module is subsequently executed, then the actual input values and the actual output values are added to the record stored in model history log 730 for the model. Furthermore, when the model is executed on another input values, then the new actual input values and the actual output values are added to the record stored in model history log 730 for the model.

In result, a record stored in model history log 730 for a model is an aggregate record of all inputs and all outputs that have been used and generated by executing the model in platform 700. The records generated and stored for all models form model history log 730.

In an embodiment, records stored in model history log 730 for a model are aggregated, retrievable, searchable, and modifiable.

In an embodiment, records stored in model history 730 for all models are aggregated, retrievable, searchable, and modifiable. The aggregated records may be, for example, searchable for particular outputs, particular recommendations, particular dates, and the like. Furthermore, the aggregated records may be subjected to a complex analysis to determine whether the latest version of a particular model performs better than the older versions of the model.

4. Scalability Considerations

In an embodiment, an approach provides a wide range of scalability options. For example, the approach allows determining an execution infrastructure platform for a model, and one or more alternative execution infrastructure platforms on which the model may also be executed. It may specify that a minimal execution infrastructure platform for a particular model may include, for example, a dual CPU, 32 GB memory card, 16 MB TrasnFlash card, and 500 GB disk storage space. But it may also specify that an alternative execution infrastructure platform for the model may include a distributed cloud system equipped with more robust CPUs and more storage space.

The scalability may also refer to using the same execution infrastructure platform to execute more than one machine-based model at the time. For example, a distributed cloud system that includes, among other things, distributed super-computers, may be used to execute two or more machine-based models simultaneously and in parallel because such a system usually provides massive computational and storage resources.

In an embodiment, platform 700 described herein allows scientists to develop and deliver a variety of model-based solutions that are scalable, widely accessible, and easily searchable and modifiable.

In an embodiment, model repository 710 is enhanced and expanded. For example, additional features are added to model repository 710 to enhance the searchability and applicability of the repository. Furthermore, the process from designing the repository to deploying the repository is optimized so that the time duration between the designing and deploying is relatively short. Model repository 710 may be also expanded by adding new models and new versions of already added models.

The enhancements may also include improvements to model execution infrastructure 730. The improvements may include additions of new hardware components, new software components, and adding state-of-the-art technologies.

The enhancements may include improvements to enhance a user experience. This includes adding sophisticated interfaces, intelligent graphical user interfaces, and other tools for helping the users to browse, use, and modify platform 700. This may also include adding an automatic generation of new models and an automatic generation of new versions of existing models.

The enhancements may also include modifications to the designs of model repository 710, model execution infrastructure 720, and model history log 730. The repositories may be designed to provide the easy accessibility to the models and the efficient organization and categorization of the models.

The enhancements may also include improvements to designing platform 700 as a turn key system which is robust enough to meet a broad spectrum of expectations and demands. The turn key system may include advanced components that take advantage of the new technological advances as they become available.

5. Example Implementations

Figure 9:
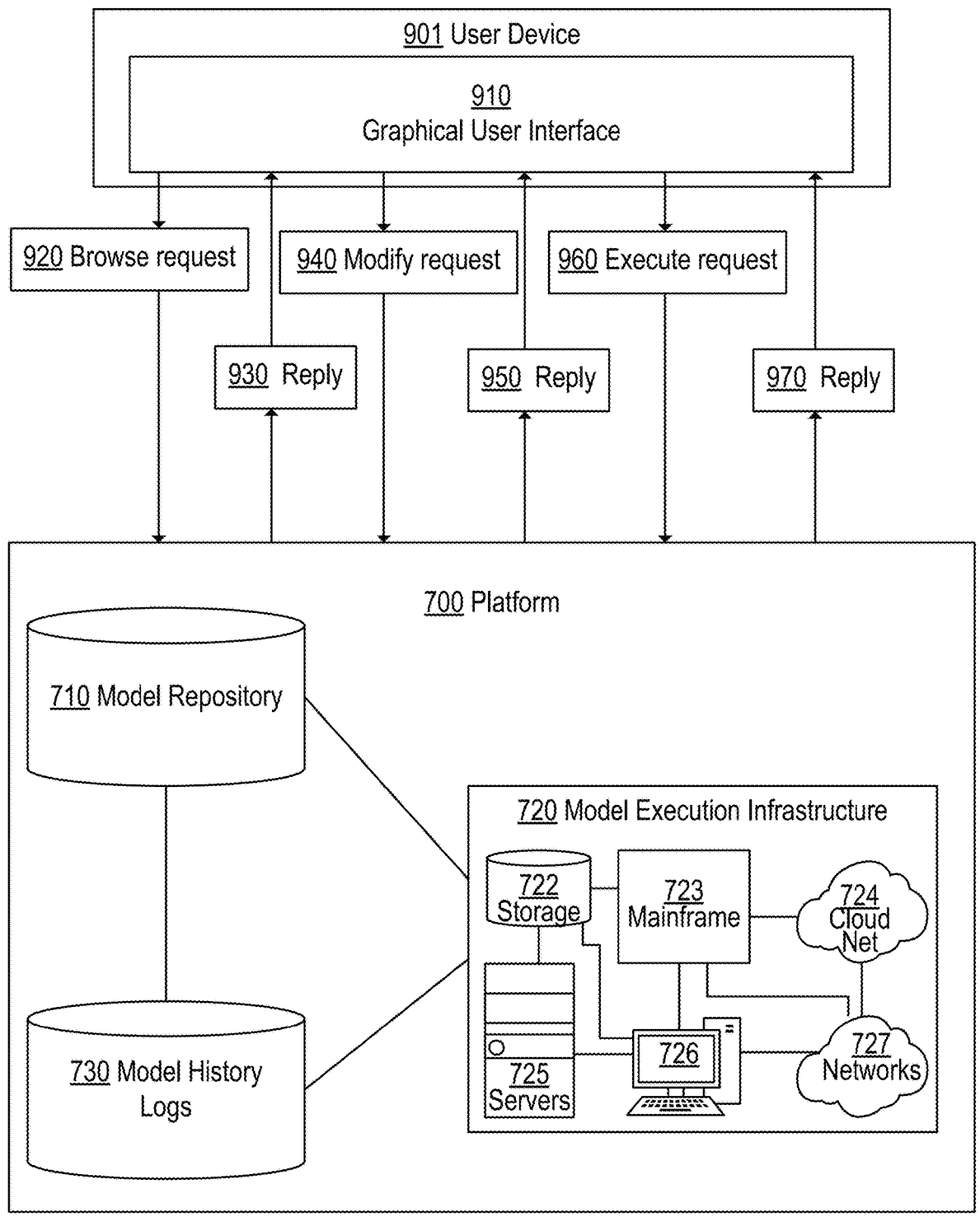
FIG. 9 depicts an example diagram for a user interface for executing machine learning algorithms.

FIG. 9 depicts an example diagram for a user interface for executing machine learning algorithms. In an embodiment, platform 700 is accessible from a user device 901 that is configured with a graphical user interface 910.

Graphical user interface 910 is generated to provide interactivity with platform 700. Graphical user interface 910 may be used to facilitate entering a query to platform 700, and obtaining, from to platform 700, a response to the query. Graphical user interface 910 may be a component that is separate from to platform 700, as depicted in FIG. 9. Alternatively, graphical user interface 910 may be part of platform 700.

In an embodiment, graphical user interface 910 is configured to generate and display graphical objects that may be used to provide queries to platform 700. The queries may include requests for browsing (920) model repository 710, browsing model history log 720, requesting information about models stored in model repository 710, modifying (940) the requests sent to platform 700, requesting (960) execution of a particular model in model execution infrastructure 720, and so forth.

Graphical user interface 910 may also be configured to receive and display responses to the queries. The responses include, for example, a reply 930 to a browse request, a reply 950 to a modify request, and/or a reply 970 to an execute request.

In an embodiment, graphical user interface 910 is configured to communicate the received queries to platform 700, and upon receiving responses to the queries, communicate the received responses to requestors.

Graphical user interface 910 may be configured to receive, from platform 700, various recommendations, instructions, and notifications and to display the recommendations/instructions/notification on display devices. For example, graphical user interface 910 may be configured to receive recommendations that are generated by executing a model on model execution infrastructure 720, and that indicate recommended strategy for an agricultural field. The recommendations may be displayed on a display device, such a mobile device 754. In an embodiment, the recommendations may be also transmitted to a computer or a controller that controls agricultural equipment, such as a seeder, a combine, a harvester, or a plough.

6. Benefits of Certain Embodiments

In an embodiment, an approach and a tool use a computer-based platform for storing, cataloging, and executing machine-based models. The platform provides a computer base for cataloging generic definitions and metadata of the models, storing the models in a repository, and browsing and selecting the models from the repository.

In an embodiment, an approach for executing machine learning algorithms provides functionalities for customizing agricultural models, cataloging, maintaining, and managing a vast number of customized models, and facilitating execution of the models to provide recommendations to crop growers.

In an embodiment, a platform for storing, executing, and cataloging machine-based models includes a model repository, a model execution infrastructure, and a model history log. The model repository is a computer-based, digital data repository configured to store models. The model execution infrastructure includes hardware and/or software components that collectively provide a platform for executing machine-based models. The model history log is a computer-based, digital log that contains information about execution of machine-based models In an embodiment, an approach for executing machine learning algorithms is implemented for agricultural applications. The approach may allow, for example, a crop grower to browse the models stored in a model repository, select a model from the repository, provide input for the selected model, and using the provided input, initiate execution of the selected model on a model infrastructure to generate recommendations for the grower.

7. Extensions and Alternatives

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set of claims that issue from this application, in the specific form in which such claims issue, including any subsequent correction.

What is claimed is:

1. A computer-implemented data processing method providing an improvement in executing machine learning processes on digital data representing physical properties related to agriculture, the method comprising:
   receiving, from a computing device, a request to browse machine learning models stored in a digital model repository;
   retrieving, from the digital model repository and transmitting to the computing device, information about the machine learning models stored in the digital model repository;
   receiving, from the computing device, a selection, from the machine learning models, of a particular model and receiving particular input for the particular model;
   using resources available in a model execution infrastructure platform, executing the particular model on the particular input to generate particular output;
   transmitting the particular output to a computer configured on an agricultural machine to control the agricultural machine as the agricultural machine performs agricultural tasks in an agricultural field.

2. The method of claim 1, further comprising:
   transmitting the particular output to the computing device;
   determining whether any modification to the particular input for the particular model is requested;
   in response to receiving an indication that a modification to the particular input is requested, receiving modified input for the particular model, and executing the particular model on modified input to generate modified particular outputs, and transmitting the modified particular output to the computing device.

3. The method of claim 1, wherein the information about the machine learning models stored in the digital model repository includes model artifacts and definitions and metadata associated with the model artifacts;
   wherein the model artifacts include one or more of: operation research model artifacts, machine learning model artifacts, deep machine learning model artifacts, or physical model artifacts;
   wherein a definition and metadata associated with a particular model artifact include one or more of: model name, input definitions, output definitions, infrastructure requirements, runtime metric, expected execution duration, expected accuracy, status information, model classification, model version, model type, or model owner name.

4. The method of claim 1, further comprising:
   receiving a request to store a machine learning model;
   parsing the request and identifying a model artifact and information about the machine learning model;
   determining input and output for the machine learning model;
   determining infrastructure requirements for executing the machine learning model;
   storing the infrastructure requirements for the machine learning model in the digital model repository;
   determining definitions and metadata for the machine learning model;
   associating the definitions and metadata with the machine learning model;
   storing the machine learning model in association with the definitions and metadata in the digital model repository.

5. The method of claim 4, further comprising: creating a record for the machine learning model and storing the record in a model history log; wherein the record for the machine learning model includes one or more of: input for executing the machine learning model, output for executing the machine learning model, or information specific to executing the machine learning model.

6. The method of claim 5, further comprising: receiving update information for the record for the machine learning model; wherein the update information includes new input and new outputs for executing the machine learning model;
in response to receiving the update information, updating the record for the machine learning model using the new input and the new outputs.

7. The method of claim 1, further comprising: receiving a new version of a machine learning model; wherein the new version of the machine learning model includes a new model artifact and new definitions and metadata;
in response to receiving the new version of a machine learning model, storing the new model artifact and the new definitions and metadata in the digital model repository; updating a record for the machine learning model in a model history log.

8. The method of claim 1, wherein the computing device is any type of device that is configured to generate, transmit and receive digital data; wherein the computing device includes any of: a personal computer, a laptop, a smartphone, a tablet, or a computer server.

9. The method of claim 1, wherein the model execution infrastructure platform includes one or more of: a computer processor, a memory unit, a storage device, a communication bus, a communications network, a cloud storage device, a cloud distributed system, a computer server, or a mainframe computer.

10. The method of claim 2, further comprising: causing the computing device to: generate and display a graphical user interface, generate a graphical representation of the modified particular outputs, and displaying the graphical representation of the modified particular output using the graphical user interface.

11. One or more non-transitory computer-readable storage media storing one or more computer instructions which, when executed by one or more computer processors, cause the one or more computer processors to perform:
receiving, from a computing device, a request to browse machine learning models stored in a digital model repository;
retrieving, from the digital model repository and transmitting to the computing device, information about the machine learning models stored in the digital model repository;
receiving, from the computing device, a selection, from the machine learning models, of a particular model and receiving particular input for the particular model;
using resources available in a model execution infrastructure platform, executing the particular model on the particular input to generate particular output;
transmitting the particular output to a computer configured on an agricultural machine to control the agricultural machine as the agricultural machine performs agricultural tasks in an agricultural field.

12. The one or more non-transitory computer-readable storage media of claim 11, storing additional instructions for:
transmitting the particular output to the computing device;
determining whether any modification to the particular input for the particular model is requested;
in response to receiving an indication that a modification to the particular input is requested, receiving modified input for the particular model, and executing the particular model on modified input to generate modified particular outputs, and transmitting the modified particular output to the computing device.

13. The one or more non-transitory computer-readable storage media of claim 11, wherein the information about the machine learning models stored in the digital model repository includes model artifacts and definitions and metadata associated with the model artifacts;
wherein the model artifacts include one or more of: operation research model artifacts, machine learning model artifacts, deep machine learning model artifacts, or physical model artifacts;
wherein a definition and metadata associated with a particular model artifact include one or more of: model name, input definitions, output definitions, infrastructure requirements, runtime metric, expected execution duration, expected accuracy, status information, model classification, model version, model type, or model owner name.

14. The one or more non-transitory computer-readable storage media of claim 11, storing additional instructions for:
receiving a request to store a machine learning model;
parsing the request and identifying a model artifact and information about the machine learning model;
determining input and output for the machine learning model;
determining infrastructure requirements for executing the machine learning model;
storing the infrastructure requirements for the machine learning model in the digital model repository;
determining definitions and metadata for the machine learning model;
associating the definitions and metadata with the machine learning model;
storing the machine learning model in association with the definitions and metadata in the digital model repository.

15. The one or more non-transitory computer-readable storage media of claim 14, storing additional instructions for:
creating a record for the machine learning model and storing the record in a model history log; wherein the record for the machine learning model includes one or more of: input for executing the machine learning model, output for executing the machine learning model, or information specific to executing the machine learning model.

16. The one or more non-transitory computer-readable storage media of claim 15, storing additional instructions for:
receiving an update information for the record for the machine learning model; wherein the update information includes new input and new outputs for executing the machine learning model;
in response to receiving the update information, updating the record for the machine learning model using the new input and the new outputs.

17. The one or more non-transitory computer-readable storage media of claim 11, storing additional instructions for:
receiving a new version of a machine learning model; wherein the new version of the machine learning model includes a new model artifact and new definitions and metadata;
in response to receiving the new version of a machine learning model, storing the new model artifact and the new definitions and metadata in the digital model repository; updating a record for the machine learning model in a model history log.

18. The one or more non-transitory computer-readable storage media of claim 11, wherein the computing device is any type of device that is configured to generate, transmit and receive digital data; wherein the computing device includes any of: a personal computer, a laptop, a smartphone, a tablet, or a computer server.

19. The one or more non-transitory computer-readable storage media of claim 11, wherein the model execution infrastructure platform includes one or more of: a computer processor, a memory unit, a storage device, a communication bus, a communications network, a cloud storage device, a cloud distributed system, a computer server, or a cloud compute system.

20. The one or more non-transitory computer-readable storage media of claim 12, storing additional instructions for:
  causing the computing device to: generate and display a graphical user interface, generate a graphical representation of the modified particular outputs, and displaying the graphical representation of the modified particular output using the graphical user interface.

\* \* \* \* \*